(12) United States Patent
Stellenberg et al.

(10) Patent No.: US 7,134,143 B2
(45) Date of Patent: Nov. 7, 2006

(54) METHOD AND APPARATUS FOR DATA PACKET PATTERN MATCHING

(76) Inventors: Gerald S. Stellenberg, 5309 Tamango Way, Austin, TX (US) 78749; Joaquin J. Aviles, 13102 Bidwell Dr., Austin, TX (US) 78729

( * ) Notice: Subject to any disclaimer, the term of this patent is extended or adjusted under 35 U.S.C. 154(b) by 269 days.

(21) Appl. No.: 10/358,409

(22) Filed: Feb. 4, 2003

(65) Prior Publication Data

US 2004/0151382 A1 Aug. 5, 2004

(51) Int. Cl.
*G06F 7/00* (2006.01)
*G06F 21/00* (2006.01)
*G06F 15/18* (2006.01)

(52) U.S. Cl. .............................. 726/25; 707/6; 382/159; 382/217; 382/219; 382/325; 726/13; 726/22; 726/23; 726/24

(58) Field of Classification Search ................. 370/395
See application file for complete search history.

(56) References Cited

U.S. PATENT DOCUMENTS

| 5,452,442 | A  | * | 9/1995  | Kephart ..................... 714/38 |
| 6,097,724 | A  | * | 8/2000  | Kartalopoulos ........... 370/395.3 |
| 6,430,184 | B1 | * | 8/2002  | Robins et al. ............... 370/392 |
| 6,578,147 | B1 | * | 6/2003  | Shanklin et al. ............ 713/200 |
| 6,954,775 | B1 | * | 10/2005 | Shanklin et al. ............ 718/105 |
| 7,017,186 | B1 | * | 3/2006  | Day .............................. 726/23 |
| 2003/0051043 | A1 | * | 3/2003  | Wyschogrod et al. ....... 709/230 |
| 2003/0177252 | A1 | * | 9/2003  | Krichevski et al. ......... 709/230 |
| 2003/0221013 | A1 | * | 11/2003 | Lockwood et al. ......... 709/231 |

OTHER PUBLICATIONS

Yu, F., et al, "Gigabit Rate Packet Pattern Matching Using TCAM", 2004, IEEE, ICNP'04, entire document.*
Cho, Y.H., et al, 'Programmable Hardware for Deep Packet Filtering on a Large Signature Set', 2004, EE Dept., Univ. of CA., entire document, www.arl.wustl.edu/~young/pub/pac204.pdf.*

* cited by examiner

*Primary Examiner*—Christopher Revak
*Assistant Examiner*—Ronald Baum
(74) *Attorney, Agent, or Firm*—Jenkens & Gilchrest, P.C.

(57) ABSTRACT

A pattern matching engine supports high speed (up to at least 2.4. Gbits per second line rate speeds) parallel pattern matching operations in an unanchored fashion. The engine is preferably implemented as a hardware device. A shift register serially receives a string of data stream bytes which are partitioned into a plurality of multi-byte overlapping adjacent stream chunks. Library patterns of bytes to be searched for are similarly partitioned into multi-byte overlapping adjacent table chunks for storage in a look-up table. The plurality of multi-byte overlapping adjacent stream chunks are applied by the register in parallel to the look-up table, with a result being returned which is indicative of whether each stream chunk matches one of the look-up table stored table chunks. The results of the parallel look-up operation are then logically combined to make a match determination.

62 Claims, 12 Drawing Sheets

Time T1

Time T2

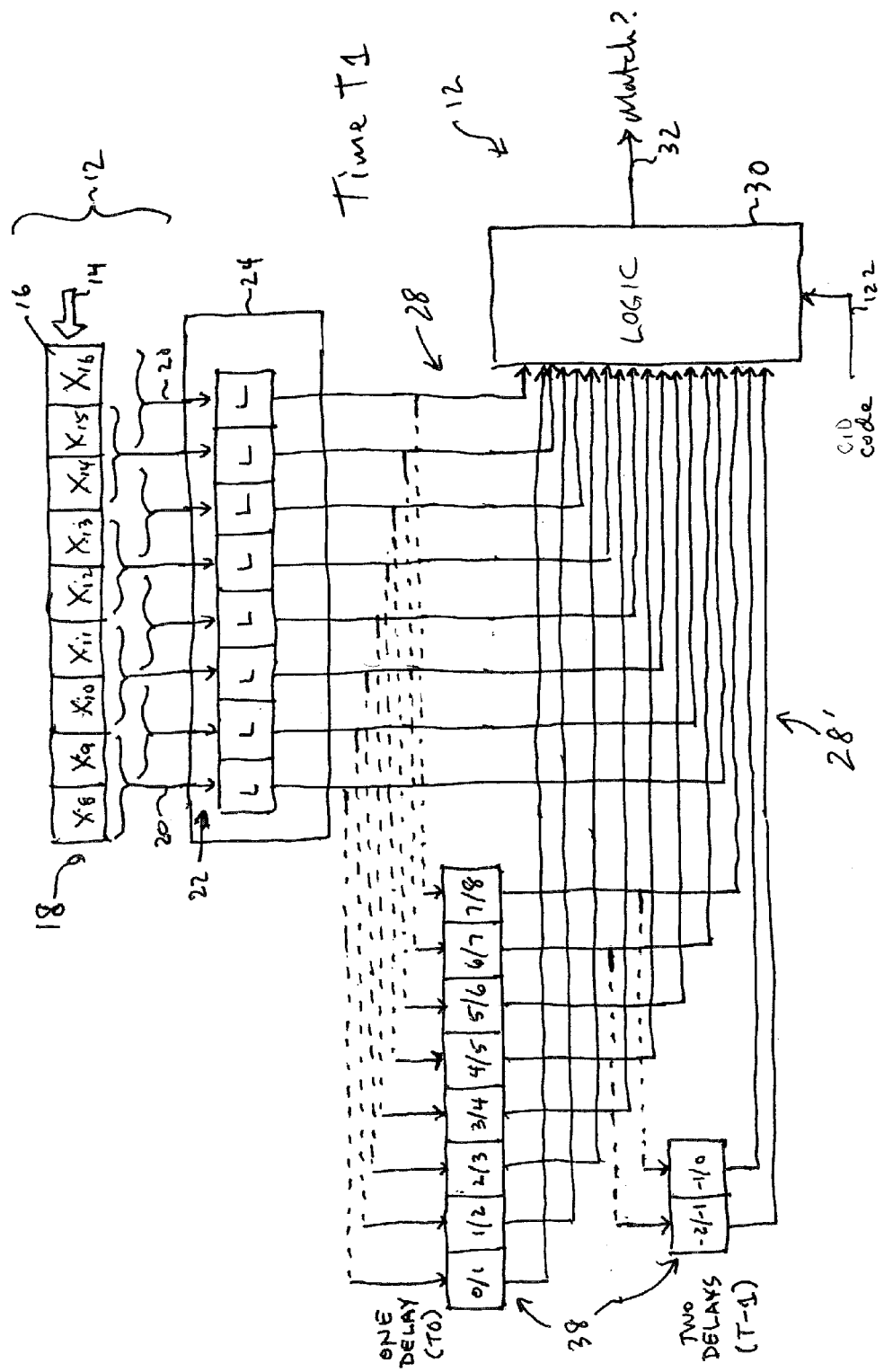

METHOD AND APPARATUS FOR DATA PACKET PATTERN MATCHING

BACKGROUND OF THE INVENTION

1. Technical Field of the Invention

The present invention relates to pattern matching operations and, in particular, to network security systems which screen a data packet stream for suspicious content using a pattern matcher.

2. Description of Related Art

As enterprises increasingly use the Internet to conduct business, the amount of confidential and sensitive information that is delivered over, and is accessible through, the Internet is also increasing. Unlike the private, dedicated communications networks that enterprises have used for business for the last several decades, which were relatively secure from outside intruders, the Internet and networks connected to an enterprise are susceptible to security threats and malicious eavesdropping due to their openness and ease of access. Recently, there has been an increase in the frequency of attempted breaches of network security, or hacker attacks, intended to access this confidential information or to otherwise interfere with network communications.

Network attacks are becoming not only more prevalent but also more sophisticated and severe, resulting in part from the availability of tools and information on how to conduct these attacks, an increase in hacker sophistication, an increase in the number of network access points that are vulnerable to attack and an increase in the overall amount of confidential information accessible through or delivered over the Internet. These attacks include distributed denial of service attacks, in which an attacker floods a Web site with large numbers of packets or connection requests that overwhelm the Web site and prevent legitimate users from accessing it. Other types of attacks are designed not just to prevent access to a Web site, but also to penetrate its security and allow a hacker to take control of a server and deface the Web site or steal sensitive information. Still other attacks include malicious eavesdropping, which allows a hacker to misappropriate confidential communication transmitted over the Internet. If confidential communications get into the wrong hands, damage to the business of the enterprise or, at the very least, damage to its reputation may arise. There is also a significant cost and negative publicity resulting from denial of service attacks. In an attempt to combat all of these types of attacks, enterprises have been increasing their security budgets to address heightened network vulnerability concerns.

Intrusion detection systems are commonly used as one measure of network defense. Such systems are commonly passive systems which operate to monitor traffic, identify portions of the traffic which are suspicious, threatening or dangerous, and then issue alerts or alarms when such traffic is detected. A problem with such systems is that alerting is a limit on their response capabilities. An ability to actively manage packets and flows in response to detected threats or dangers is needed. An additional problem is that such systems are quite slow and do not possess the capability of effectively and efficiently monitoring packet streams at line rates in the gigabit per second, or above, range.

Effort has accordingly been expended in developing intrusion prevention systems. The intrusion prevention system is designed as an active traffic monitoring system. Preferably, such systems are placed "in-line" with respect to the packet data stream, and may exist as part of the infrastructure for the protected network. With such an architecture, the system must operate under the same performance benchmarks as are applicable to a network switch or router. Packets entering the system must be inspected and either forwarded or blocked within a few millisecond window of time.

It is known that the screening operation performed to examine the packet traffic takes time and thus can delay packet traffic transport throughput. This delay concern is magnified as the volume of traffic to be examined increases and the intrusion detection system presents a potential bottleneck to packet traffic passage. Further delays in throughput time for packet handling result from the use of more comprehensive (and time consuming) screening operations.

The in-line screening process may take the form of a pattern matching operation. In this operation, the passing packet traffic is compared against a library containing stored patterns of known suspicious, threatening or dangerous packet traffic. In the event a match is found between the screened packet traffic and a pattern entry in the library, an alert or alarm may be issued, and furthermore the matching packet traffic may be captured before any damage is done.

In order for such a pattern matching operation to be effective, it is important that the operation not unduly affect packet throughput. In other words, the pattern matching operation must not act as a bottleneck and restrict packet flow. As the rate of packet flow has increased over time (for example, towards and above 2.4 Gbits per second), existing software-based prior art solutions and existing hardware-based prior art solutions (such as direct memory access type matching systems) have been unable to meet throughput needs by unacceptably restricting the flow of packets. For this reason (and others relating to cost and size of the necessary memory), these prior art pattern matching systems no longer present satisfactory solutions.

A need accordingly exists for a more efficient approach to pattern matching for use in applications such as packet screening.

SUMMARY OF THE INVENTION

The present invention is a pattern matching engine that supports high speed (up to at least 2.4. Gbits per second line rate speeds) parallel pattern matching in an unanchored fashion. The engine is preferably implemented as a hardware device.

In accordance with one embodiment of the pattern matching engine, a shift register serially receives a string of data stream bytes. The shift register partitions the string of data stream bytes into a plurality of multi-byte overlapping adjacent stream chunks (or sub-strings). Library patterns of bytes to be searched for are partitioned into multi-byte overlapping adjacent table chunks which are stored in a look-up table. The plurality of multi-byte overlapping adjacent stream chunks are then applied in parallel to the look-up table which stores the table chunks. Results of the parallel look-up operations are then logically combined to determine whether a portion of the data stream matches one of the patterns of bytes.

Pre-matching operations to characterize the data stream may also be performed. The results of the data stream characterization are then made available to assist the pattern matcher in reducing the field of library patterns under consideration.

An additional pre-matching operation may reassemble out of order packets within the data stream. Correctly ordered packets are thus made available to the pattern matcher to improve matching accuracy.

Yet another additional pre-matching operation may decode any encoded portions of the data stream. In this way, the library patterns need only be supplied in decoded format. As an enhancement, the library patterns may be supplied in both encoded and decoded format, with the pattern matching operation being performed with respect to both the encoded and decoded data stream portions.

Multiple look-up tables may be used to store overlapping adjacent table byte chunks for different classes of library patterns to be found. The different classes of library patterns may comprise different length patterns for each look-up table. The different classes of library patterns may further comprise different traffic category patterns for each look-up table.

BRIEF DESCRIPTION OF THE DRAWINGS

A more complete understanding of the method and apparatus of the present invention may be acquired by reference to the following Detailed Description when taken in conjunction with the accompanying Drawings wherein:

FIGS. 6A and 6B illustrate a preferred embodiment for the packet traffic screening engine using the technique illustrated in FIG. 2B;

DETAILED DESCRIPTION OF THE DRAWINGS

Figure 1:
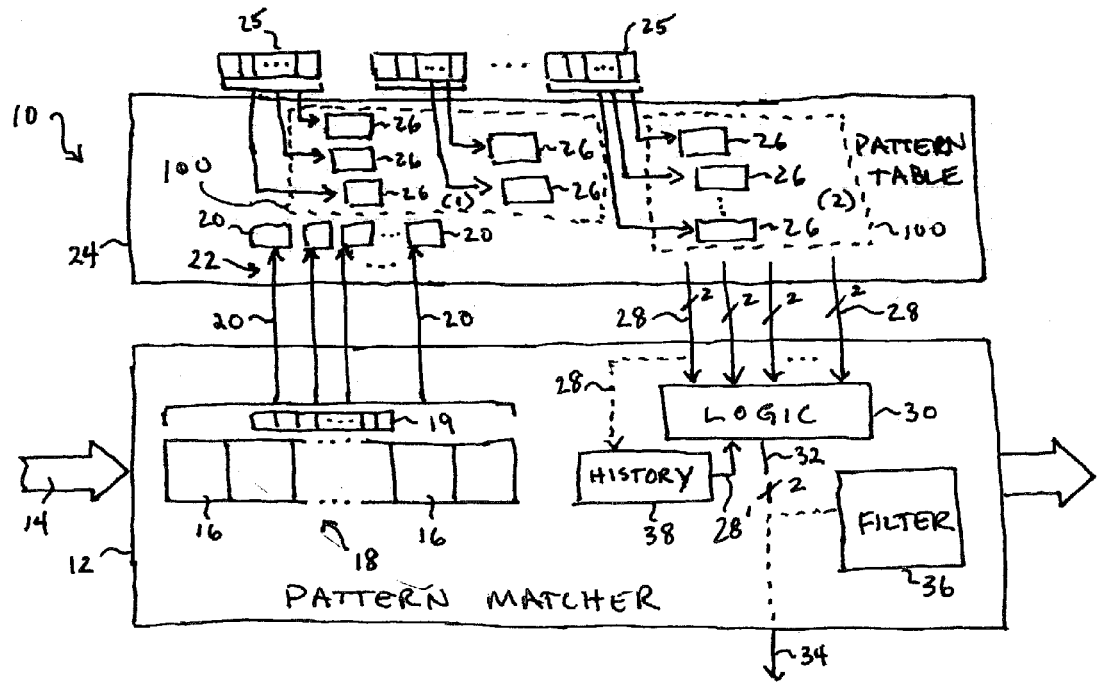
FIG. 1 is a block diagram illustrating an engine for packet traffic screening in accordance with an embodiment of the present invention.

Reference is now made to FIG. 1 wherein there is shown a block diagram illustrating an approach to packet traffic screening in accordance with an embodiment of the present invention. A screening engine 10 (useful in a number of applications including, for example, network protection, intrusion prevention, firewalling, anti-virus content filtering, and the like) implements a pattern matching processing technique. A pattern matcher 12 is placed "in-line" with respect to, and thus receives, a data packet stream 14. This may, for example, be a data packet stream having a line rate up to, and in excess of, 2.4 Gbits per second. The pattern matcher 12 includes a multi-cell 16 serial shift register 18 for sequentially processing the received data packet stream 14. Once each of the cells 16 of the register 18 is loaded with a byte of the data packet stream (the loaded bytes making up a data string comprising all or a portion of a "stream pattern" 19 to be evaluated), the pattern matcher 12 divides the bytes of the data string within the register into a plurality of overlapping byte chunks 20 (the "stream pattern byte chunks"). In a preferred embodiment of the invention, the bytes of the stream 14 which are loaded into the register 18 comprise only the payload portions of the included stream packets. Review of the entire data stream (and multiple flows therein, as will be described) is also supported. Each of the plurality of overlapping stream pattern byte chunks 20 is then output for a given clock cycle in a parallel format 22.

The screening engine 10 further includes a pattern table 24 for storing information concerning patterns of bytes (in packet traffic) which have been previously identified as suspicious, threatening or dangerous (the "table patterns" 25, also referred to as library patterns). In order to minimize latency and maximize speed of the screening engine 10 process for examining the data packet stream for the presence of these table patterns 25 of bytes, the table patterns are similarly divided into overlapping byte chunks 26 (the "table pattern byte chunks") and stored in the pattern table 24 in a look-up table type format.

The output overlapping stream pattern byte chunks 20 for a given clock cycle are then applied in parallel 22 to the pattern table 24 where a corresponding plurality of parallel look-ups are performed against the table pattern byte chunks 26. This look-up operation is preferably implemented in a manner where the stream pattern byte chunks 20 are viewed as addresses which are applied to the pattern table implemented as an addressable memory. If the memory has a valid address (i.e., one of the table pattern byte chunks 26) corresponding to the stream pattern byte chunk 20, then a match for that address has been found. The result of each comparison (address) lookup is a return (also referred to as a result) 28 that is output from the pattern table 24. If a given stream pattern byte chunk 20 matches one of the stored table pattern byte chunks 26 found in the pattern table 24, the look-up operation returns 28 a first logic state (for example, true or logic 1) with respect to that comparison, and otherwise returns 28 a second logic state (for example, false or logic 0). Because a plurality of such matching look-up operations are being performed in parallel for each clock cycle, a corresponding plurality of returns 28 are provided to the pattern matcher 12. The returns 28 from the pattern table 24 look-up operation are then logically combined (for example, logically ANDed and/or logically ORed) 30 by the pattern matcher 12 to determine whether a match for the table pattern 25 (i.e., the previously identified suspicious, threatening or dangerous patterns of bytes) has been found in the stream pattern 19 (within the received data packet stream 14) under examination. In this case, an assumption (which is not entirely accurate, as will be discussed below) is made by the pattern matcher 12 that if each individual stream pattern byte chunk 20 is found in the pattern table 24 (i.e., matching a table pattern byte chunk 26) then the stream pattern 19 itself matches one of the table patterns 25.

Responsive to an indication 32 from the logical combiner 30 of a positive match between each of the stream chunks (relating to the string stream pattern 19) and the table chunks relating to table patterns 25 as stored in the pattern table 24, the pattern matcher 12 decides how the received data packet stream 14, in general, and the stream pattern 19 (or string) under examination therein, in particular, should be handled. For example, the positive match may trigger the issuance of an alert or alarm 34. Alternatively, the received data packet stream 14, the matching stream pattern 19 (or string) therein, and/or other associated data packets or streams or strings, may be captured or blocked at the pattern matcher 12 by appropriate packet filtering functionality 36. Still further, the alert or alarm 34 issued by the pattern matcher 12 may trigger a separate component or functionality, for example, a firewall (not shown), to capture or block the received data packet stream 14, the matching stream pattern 19 (or string) therein, and/or other associated data packets or streams or strings at a location downstream of the engine 10. As yet another option, the received data packet stream 14, the matching stream pattern 19 (or string) therein, and/or other associated data packets or streams or strings may be separated from the data stream and passed on to a more in-depth examination by a secondary processing (screening) layer.

Figure 2A:
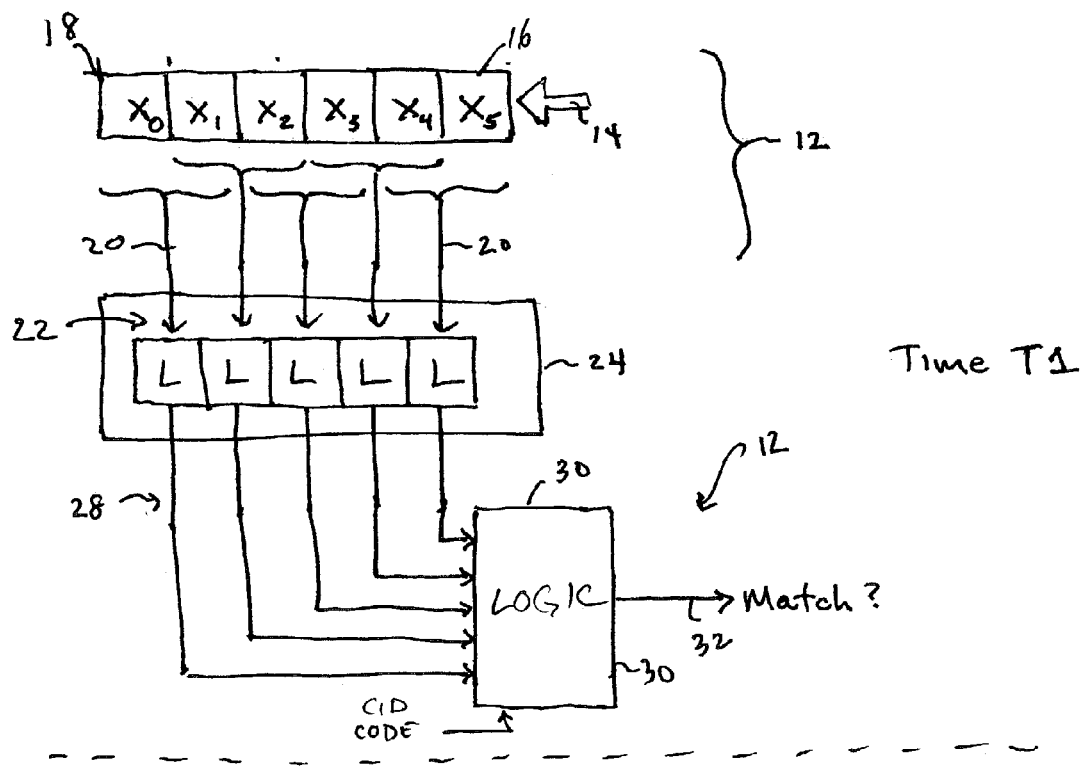
FIGS. 2A and 2B illustrate exemplary embodiments for how stream patterns are loaded into a shift register and processed by the engine.
Figure 2A:
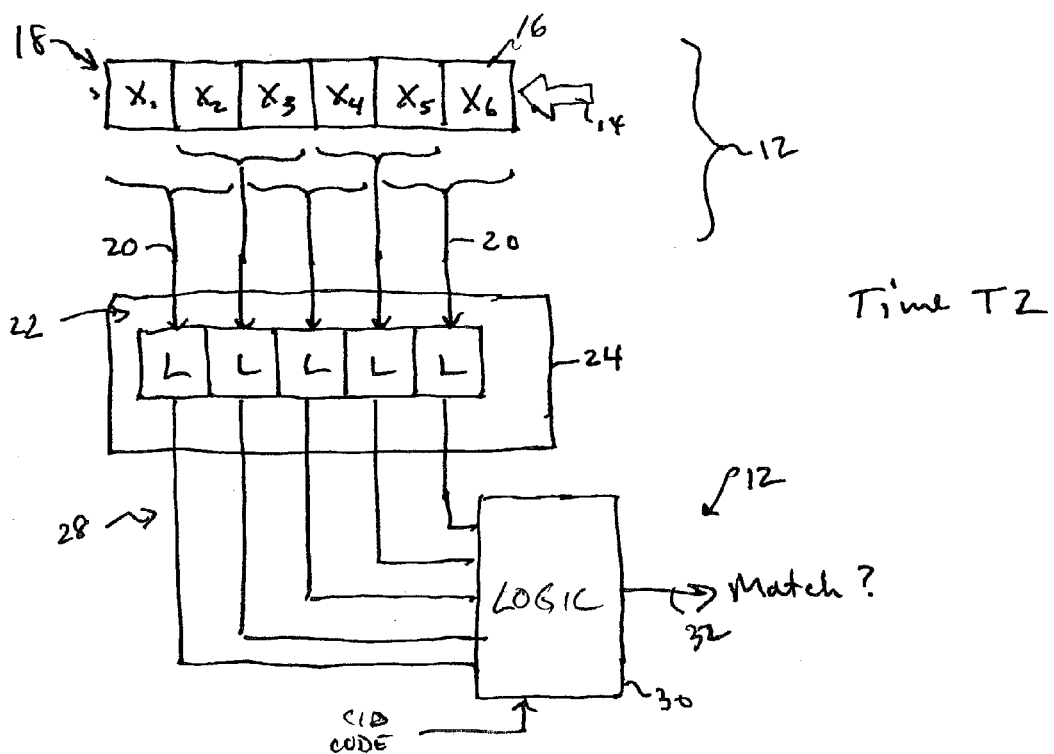
Figure 2B:
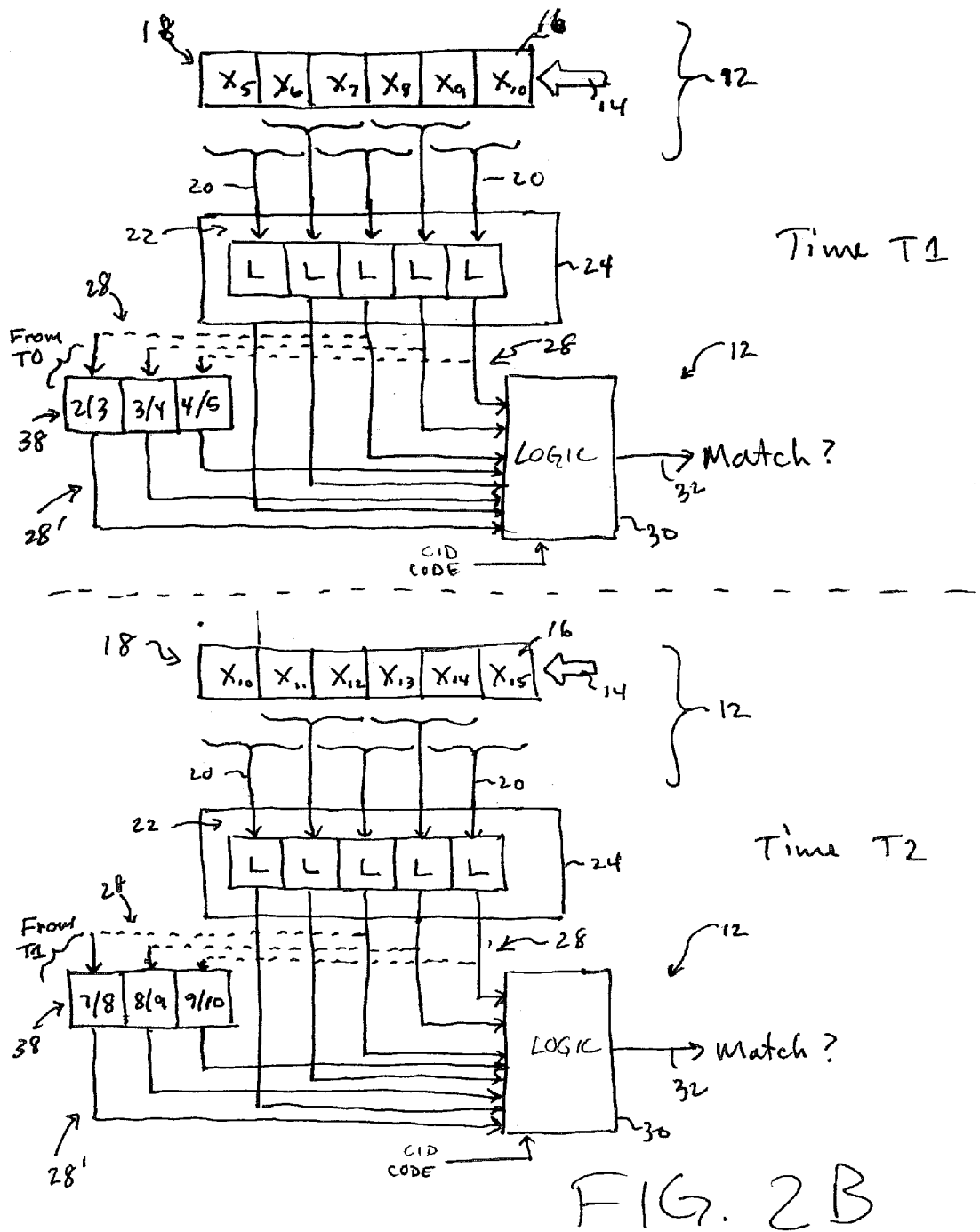

Reference is now made to FIGS. 2A and 2B for an explanation of two embodiments for how stream patterns/strings (for example, the payload portions of stream packets) may be loaded into the shift register 18 and processed by the system of FIG. 1. Assume a data packet stream 14 of the format:

$X_0, X_1, X_2, X_3, X_4, X_5, X_6, X_7, X_8, X_9, X_{10}, X_{11}, \ldots, X_{n-1}, X_n, \ldots$ Further assume that the table patterns 25 are P bytes in length. Still further assume that the byte overlap is two, and thus each table pattern 25 will produce P−1 associated table pattern byte chunks 26 for storage in the pattern table 24. The shift register 18 includes N cells 16. In this configuration, there could be N=P cells 16 within the shift register 18 (although, as discussed herein, there is no requirement for N=P and in fact certain advantages accrue when P≠N).

For the embodiment illustrated in FIG. 2A, the bytes X of the data packet stream 14 are sequentially shifted into the register 18 one byte at a time. In other words, with each clock cycle, one new byte is shifted into the register 18 and one old byte is shifted out of the register. With each clock cycle, the pattern matcher 12 further generates P−1 overlapping stream pattern byte chunks 20 which represent the stream pattern (or string) currently in the register 18 that is under examination.

To illustrate this, consider a certain clock cycle T1 in FIG. 2A wherein the N=P cells 16 of the shift register 18 are loaded with the following bytes (the string):

$X_0, X_1, X_2, X_3, X_4, X_5$

During clock cycle T1, the pattern matcher 12 will divide (or partition) the bytes of the string into P−1 overlapping stream pattern byte chunks 20 as follows:

$(X_0, X_1), (X_1, X_2), (X_2, X_3), (X_3, X_4), (X_4, X_5)$

Each of these overlapping stream pattern byte chunks 20 is then output for application in parallel 22 to the pattern table 24 for comparison (look-ups L) to the table pattern byte chunks 26 stored therein. If each of the stream pattern byte chunks 20 is found in the pattern table 24, first logic states will be returned 28 with respect to each chunk and the logic 30 will generate an indication 32 of a positive match with respect to the stream pattern 19 under examination. This indication 32 is preferably issued during the same clock cycle as the look-up, but may if desired be issued in a subsequent clock cycle. If any one or more of the look-ups L fails to find a match, one or more corresponding second logic states will be returned 28, and the logic 30 will generate an indication 32 of no match with respect to the stream pattern 19 under examination.

Now, assume time advances by one to the next clock cycle T2. With this advancement, the oldest byte in the register 18 is shifted out, and a next byte in the data packet stream 14 is shifted in. At this point in time, the N cells 16 of the shift register 18 are loaded with the bytes (the string):

$X_1, X_2, X_3, X_4, X_5, X_6$

During clock cycle T2, the pattern matcher 12 will divide (or partition) the bytes of the string into P−1 overlapping stream pattern byte chunks 20 as follows:

$(X_1, X_2), (X_2, X_3), (X_3, X_4), (X_4, X_5), (X_5, X_6)$

Each of these overlapping stream pattern byte chunks 20 is then output for application in parallel 22 to the pattern table 24 for comparison (look-ups L) to the table pattern byte chunks 26 stored therein. If each of the stream pattern byte chunks 20 is found in the pattern table 24, first logic states will be returned with respect to each chunk and the logic 30 will generate an indication 32 of a positive match with respect to the stream pattern 19 under examination. Conversely, if any one or more of the look-ups L fails to find a match, one or more corresponding second logic states will be returned 28, and the logic 30 will generate an indication 32 of no match with respect to the stream pattern 19 under examination.

While this single byte shift per clock cycle implementation works satisfactorily, it is recognized that a more efficient process may be implemented as shown in FIG. 2B. Rather than have the bytes X of the data packet stream 14 be sequentially shifted into the register 18 one byte at a time, it is preferred to shift N−1 bytes at a time (also referred to as shifting a block of bytes at a time). In other words, with each clock cycle, a new block of N−1 bytes is shifted into the register 18 while an old block of N−1 bytes is shifted out of the register. In a manner identical to that set forth above, with each clock cycle, the pattern matcher 12 further generates P−1 overlapping stream pattern byte chunks 20. However, due to the block shifting of N−1 bytes per clock cycle and the overlapping of the chunks, the logic 30 must not only consider the corresponding P−1 returns 28 for the current clock cycle, but also one or more of the returns 28 from previous clock cycle(s) in order to make the match determinations. To assist with this operation, the pattern matcher 12 includes an historical memory 38 that temporarily saves the returns 28 from the previous clock cycle(s) for application as returns 28' during a current clock cycle. Then, selected ones of the returns 28/28' are logically combined to make a match determination with respect to the clock cycle. To account for the block shift, this clock cycle match determination is in reality a composite result of several separate match determinations made at different shift locations. This concept will be explained in more detail herein.

To illustrate the block shifting operation, consider a certain clock cycle T1 in FIG. 2B wherein the N=P cells 16 of the shift register 18 are loaded with the following bytes (the string):

$X_5, X_6, X_7, X_8, X_9, X_{10}$

During clock cycle T1, the pattern matcher 12 will divide (or partition) the bytes of the string into P−1 overlapping stream pattern byte chunks 20 as follows:

$(X_5, X_6), (X_6, X_7), (X_7, X_8), (X_8, X_9), (X_9, X_{10})$

Each of these overlapping stream pattern byte chunks 20 is then output for application in parallel 22 to the pattern table 24 for comparison (look-ups L) to the table pattern byte chunks 26 stored therein. If each of the stream pattern byte chunks 20 is found in the pattern table 24, first logic states will be returned 28 with respect to each chunk.

It must be remembered, however, because of block shifting, that during the previous clock cycle T0, the N cells 16 of the shift register 18 were loaded with the following stream pattern:

$X_0, X_1, X_2, X_3, X_4, X_5$ and thus only the byte $X_5$ is shared in common between the matching operations performed in the consecutive clock cycles. Due to the P byte table pattern, two byte overlap and the N−1 byte block shift, the logical combiner 30 needs to have access to the returns 28 from clock cycle T0 with respect to the following overlapping stream pattern byte chunks 20:

$(X_2,X_3), (X_3,X_4), (X_4,X_5)$ in order to make the necessary match determinations at each shift location. These returns 28 are accordingly preserved from clock cycle T0 in the historical memory 38, and are then provided, as reused returns 28', in clock cycle T1 along with the current set of returns 28.

The returns 28 and 28' are selectively used in this implementation to make the match determinations. Due to the N−1 byte shift, the logic combiner 30 must look for a pattern match at a plurality of locations across the bytes of the shift. Thus, for each location, the logic 30 tests whether the stream pattern byte chunks 20 at issue for that shift location are found in the pattern table 24 (as indicated by consecutive first logic states with respect to only certain ones of the current clock cycle returns 28 as well as certain ones of the historic returns 28' from the prior clock cycle). In the event those certain consecutive returns 28 and 28' are true, the logic 30 will find a match at that shift location and generate an indication 32 of a positive match for the clock cycle with respect to the stream pattern 19 under examination. This indication 32 is preferably issued during the same clock cycle as the look-up, but may if desired be issued in a subsequent clock cycle. If none of the match determinations at the shift locations for the current clock cycle are positive (for example, because one or more of the pertinent returns 28/28' at each shift location have second logic states), the logic 30 will generate an indication 32 of no match with respect to the stream pattern 19 under examination.

To assist with the examination during the next clock cycle (T2), the current clock cycle returns 28 for the following overlapping stream pattern byte chunks 20:

$(X_7,X_8), (X_8,X_9), (X_9,X_{10})$ are saved in the historical memory 38.

Figure 5:
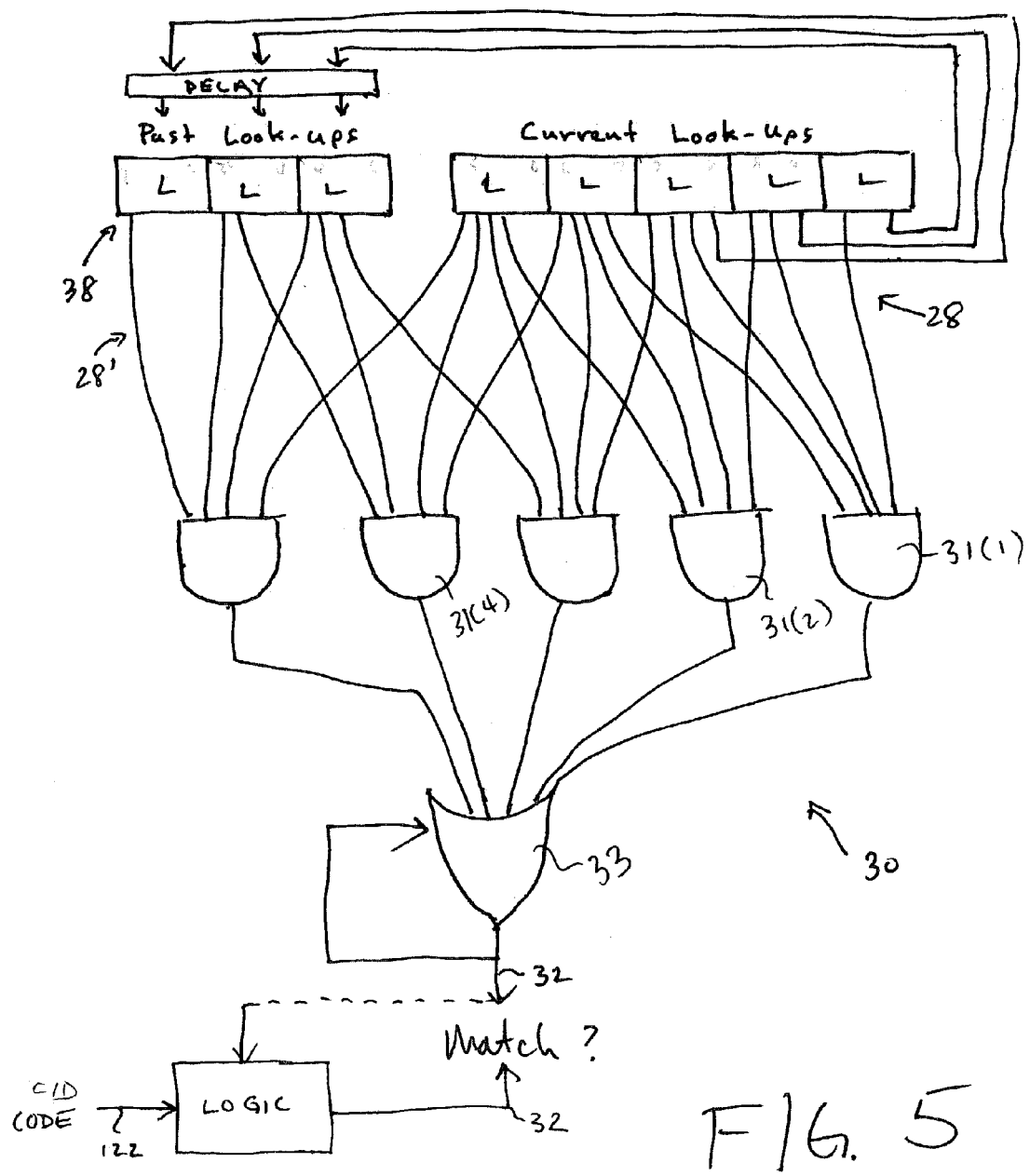
FIG. 5 is a block diagram showing an implementation of a logic combiner for the engine illustrated in FIG. 2B.

The foregoing selective use of the returns 28 and 28' for the purpose of making match determinations may be better understood by referring to FIG. 5 wherein there is shown a block diagram of an exemplary implementation of a logic combiner 30 for the technique illustrated in FIG. 2B. This circuit design assumes a true return 28/28' is a logic 1, and has been designed specifically for the implementation of FIG. 2B. The general architecture of the logic 30 in FIG. 5 is, however, applicable to any implementation of a FIG. 2B type block shifting solution.

A plurality of AND gates 31 are presented to logically AND selected consecutive ones of the look-up table returns 28/28'. More specifically, N−1 AND gates 31 are included to make the match determinations at a corresponding N−1 shift locations taking into account all the bytes across the block shift (i.e., considering not only the bytes of the current string, but also the bytes of past string(s)). Thus, a first of the AND gates 31(1) considers four consecutive returns 28 (as needed for a five byte pattern match) with respect to finding a pattern match at the shift location of bytes $X_6$–$X_{10}$ in FIG. 2B (time T1). One byte shift over is then made, and a second of the AND gates 31(2) considers four consecutive returns 28 with respect to finding a pattern match at the shift location of bytes $X_5$–$X_9$ in FIG. 2B. Moving on now, for example, two byte shifts over, a fourth of the AND gates 31(4) considers four consecutive returns 28/28' with respect to finding a pattern match at the shift location of bytes $X_3$–$X_6$ in FIG. 2B. It may thus be noted that N−1 separate match comparisons, with each comparison considering P−1 consecutive returns 28/28' for N−1 shift locations, are performed by the logic 30. An OR gate 33 logically combines the results of the N−1 AND operations to generate the indication 32. Thus, if any of those AND gate performed match comparisons is successful (i.e., all pertinent consecutive returns 28/28' input to the AND gate are logic 1), then a match result indication 32 of true is generated by the OR gate.

What is important to recognize from the exemplary combiner 30 of FIG. 5 is that each AND gate performs a separate match look-up test (related to a specific shift location in the implemented block shift), and the OR gate produces a match result indication 32 of "true" if any of the AND gates find a match. Put another way, operating in parallel, each of the AND gates tests for a match (when all appropriate returns 28/28' applied thereto are true) with respect to a different shift location in the data stream (i.e., on a different stream pattern), and a true match result indication 32 is output for the current clock cycle if the P−1 consecutive stream chunks of any tested stream pattern matches the stored table chunks.

Now, assume time advances by one to the next clock cycle T2. With this advancement, the N−1 oldest bytes in the register 18 are shifted out, and N−1 next bytes in the data packet stream 14 are block shifted in. At this point in time, the N cells 16 of the shift register 18 are loaded with the bytes (the string):

$X_{10},X_{11},X_{12},X_{13},X_{14},X_{15}$

During clock cycle T2, the pattern matcher 12 will divide (or partition) the bytes of the string into P−1 overlapping stream pattern byte chunks 20 as follows:

$(X_{10},X_{11}), (X_{11},X_{12}), (X_{12},X_{13}), (X_{13},X_{14}), (X_{14},X_{15})$

Each of these overlapping stream pattern byte chunks 20 is then output for application in parallel 22 to the pattern table 24 for comparison (look-ups L) to the table pattern byte chunks 26 stored therein. Again, as discussed above through the illustrative example of FIG. 5, the returns 28 and 28' are selectively used to make match determinations. The logic combiner 30 looks for a pattern match at a plurality of shift locations across the bytes of the block shift by testing, for each location, whether the stream pattern byte chunks 20 at issue for that shift location are found in the pattern table 24. In the event first logic states with respect to the pertinent, consecutive, ones of the current clock cycle returns 28 and/or historic returns 28' from the prior clock cycle are present with respect to any one shift location, then a match indication 32 is generated for that clock cycle. Conversely, if a second logic state is returned 28 or 28' with respect to each of the shift location match comparisons, then the logic 30 will generate an indication 32 of no match with respect to the stream pattern 19 under examination.

Again, it will be understood that the current clock cycle returns 28 for the following overlapping stream pattern byte chunks 20:

$(X_{12},X_{13}), (X_{13},X_{14}), (X_{14},X_{15})$ will be saved in the historical memory 38 to assist with the examination during the next clock cycle (T2). The foregoing process then repeats over and over to continue examination and screening of the stream 14.

Figure 4:
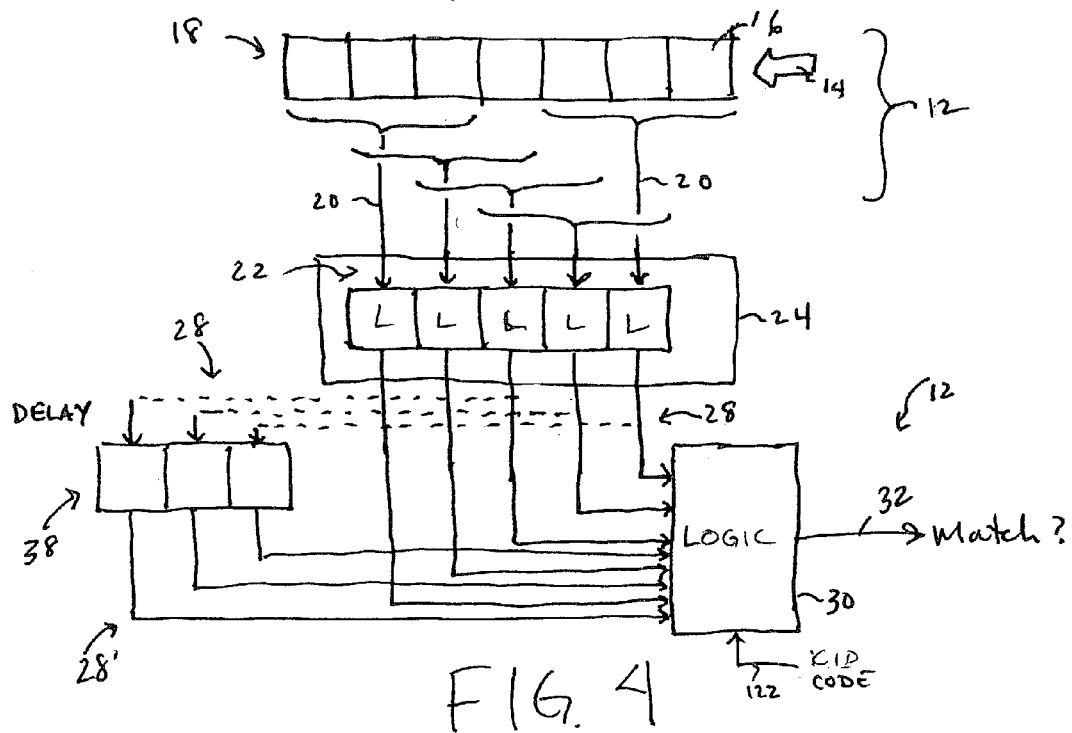
FIGS. 3A, 3B and 4 illustrate exemplary implementations of the technique illustrated in FIG. 2B.
Figure 3A:
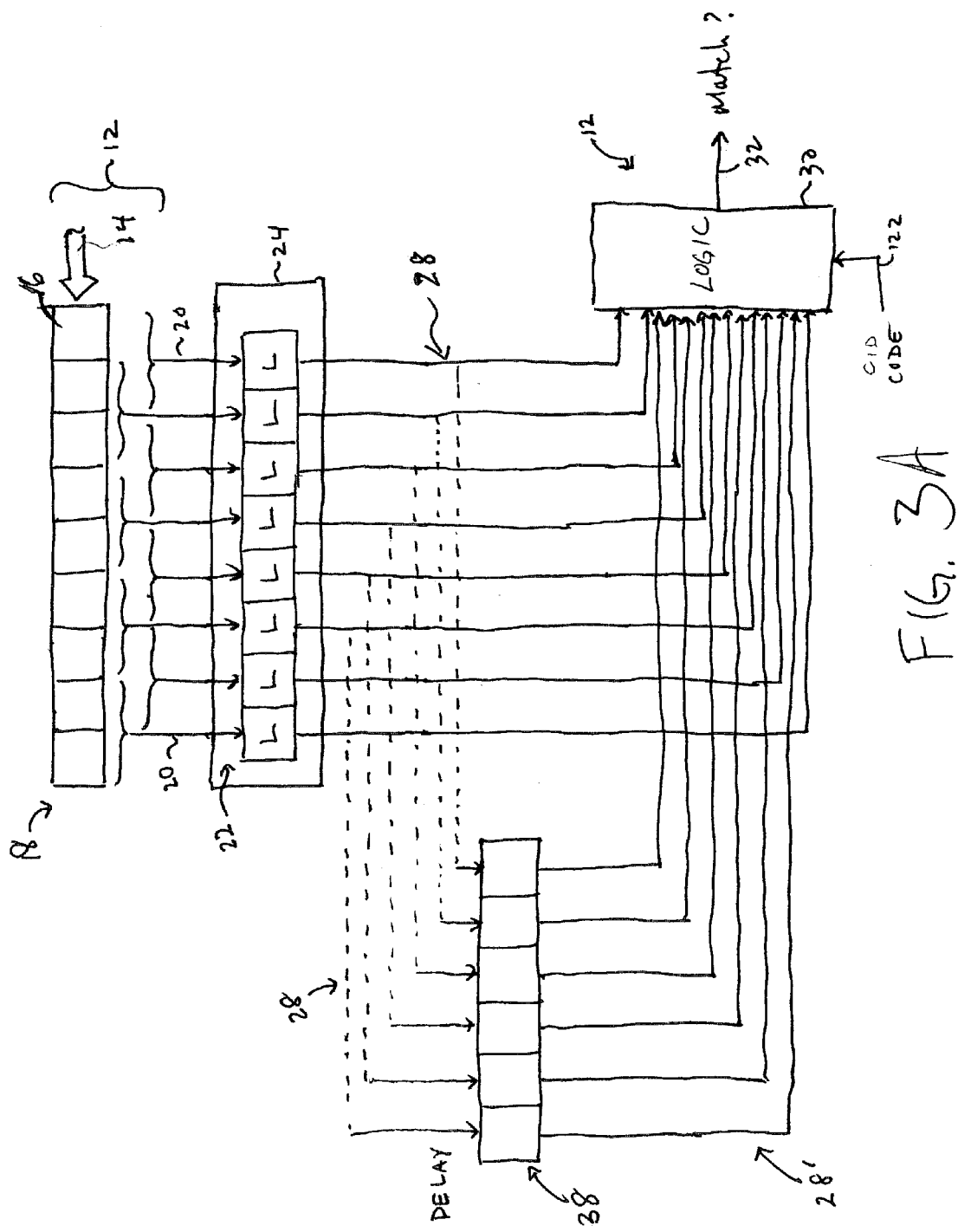
Figure 3B:
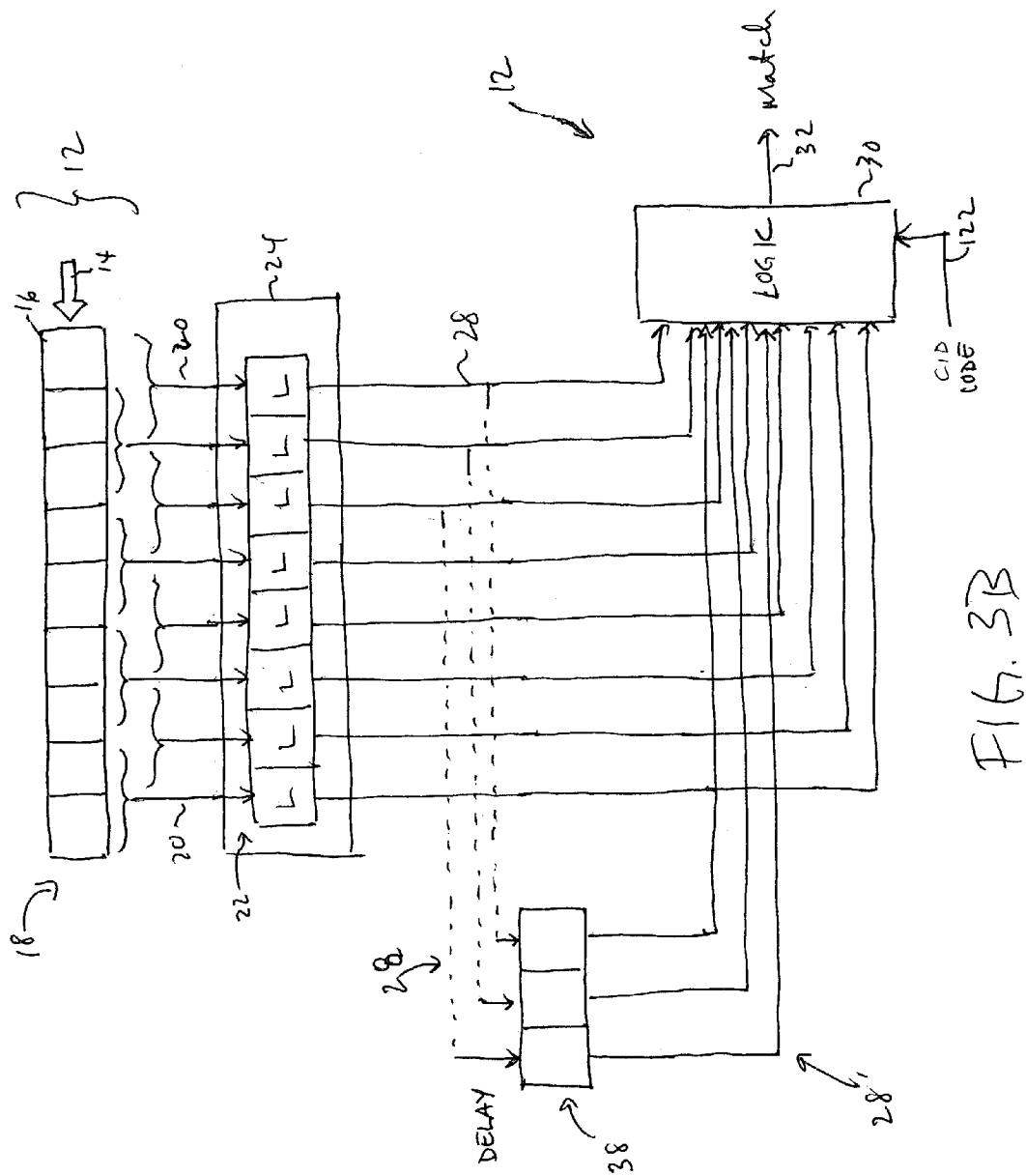

It will, of course, be understood that the foregoing scenario with N=P=6, a two-byte overlap and an N−1 byte block shift is exemplary in nature. The user can choose any suitable combination of pattern size, byte overlap, byte block shift amount and pattern look-ups, as is desired and fits within the processing requirements for the data packet stream being reviewed. For example, FIG. 3A illustrates the operation of the FIG. 2B-*type* solution with P=8 byte table patterns, N=9 cells 16, a two-byte overlap and an N−1 byte block shift. Still further, FIG. 3B illustrates the operation of the FIG. 2B-*type* solution with P=5 byte table patterns, N=9 cells 16, a two-byte overlap and an N−1 byte block shift. Lastly, as another example, FIG. 4 illustrates the operation of the FIG. 2B-*type* scenario with P=5 byte table patterns, N=7 cells 16, a three-byte overlap and an N−1 byte block shift. Detailed explanation of the examples of FIGS. 3A, 3B and 4 will not be provided as it is believed that one skilled in the art would understand operation in each case with knowledge of the FIG. 2B-*type* scenario and in view of the accompanying FIG. 2B description provided herein. The examples of FIGS. 3A, 3B and 4 are further provided to illustrate the flexibility of the FIG. 2B-*type* solution to handle different sized byte patterns, register sizes and overlaps. In this way, it will be recognized that the solution can be tailored to the specific processing and data handling needs and restrictions of the user when designing and implementing a pattern matching system.

It is recognized that multiple flows may simultaneously exist within the same packet data stream such that the data packets of the multiple flows are interleaved with each other. The engine 10 is capable of simultaneously handling the screening of multiple flows. To accomplish this, the engine 10 keeps track of packet state across the many flows (i.e., to which flow does each packet belong?). In addition to storing the returns 28 for use in later clock cycles, the historical memory 38 records the context of each flow and then makes the proper contextual historical returns 28 available when a new packet pertaining to a different flow comes under examination.

The register loading process and associated look-up process implemented by either of the FIG. 2A or FIG. 2B illustrate an important feature of the present. Because of the shifting process used as the register is loaded for each clock cycle match, and with the logical operations performed by the combiner 30 to look for matches at different locations in the stream, the pattern match operation being performed can be recognized (or characterized) as being unanchored. By "unanchored" it is meant that pattern matcher is capable of looking for a table pattern of interest at any selected byte location within the stream 14. This is to be contrasted with an "anchored" search where the look-up for finding a matching pattern is tied to a specific location within the stream (for example, in the packet header, in a certain header field (like an IP address), at a specific location within the payload, and the like). An unanchored pattern match like that supported by the present invention provides a much more flexible solution than anchored searches. This unanchored feature is a requirement for pattern matchers operating to detect higher layer actions that are not identifiable patterns in packet header fields. The unanchored nature of the process is further emphasized by the functionality performed by the logic combiner 30 in the FIG. 2B solution through its separate examination, for a given clock cycle, of plural shift locations, and the generation of a match indication 32 when a match of consecutive stream chunks is found at any of the examined locations for a given clock cycle.

Reference is now once again made to FIG. 5. Although the illustrated combinational logic is specific to the FIG. 2B implementation, and no details have been provided with respect to the logic combiner 30 for FIGS. 3A, 3B and 4, it is believed that one skilled in the art is capable of designing the logic circuitry necessary to logically combine the returns 28 (and 28', if needed, for each shift location) and produce a match result indication 32. What is important to remember is that separate match look-up testing must be performed in the block shifting implementation for each possible shift location. A match of the pertinent, consecutive, returns 28/28' for any of those shift locations is indicative of a match for the clock cycle, and must produce a match indication 32. Conversely, a failure to match at least one return 28/28' for each of the shift locations is indicative of a no-match for the clock cycle, and must produce a no match indication 32. Preferably, these separate match look-up tests are performed in parallel. Further detailed description of the combinational logical implementation for any logic combiner 30 herein will not be provided, and it is believed that, with the exemplary design illustrated in FIG. 5, one skilled in the art would be capable of designing the combinational logic necessary to implement any desired P, N, overlap, block shift embodiment of the FIG. 2B-*type* solution. It should, however, be noted that in the event the match determination analysis is desired to be made with respect to an entire packet (as opposed to just a single stream pattern), the logical OR action performed by the OR gate may be iterated over a plurality of clock cycles until the end of the packet is reached (as shown by the illustrated return loop in FIG. 5) before producing a match result indication 32.

FIG. 5 further illustrates in an exemplary fashion how the returns 28 for a current look-up operation (i.e., a current clock cycle) are saved in the historical memory 38 for later use as the returns 28' (in the next clock cycle) Implementation of the appropriate logic and/or delay circuitry to properly load the cells of the historical memory is well within the capabilities of those skilled in the art.

Figure 6B:
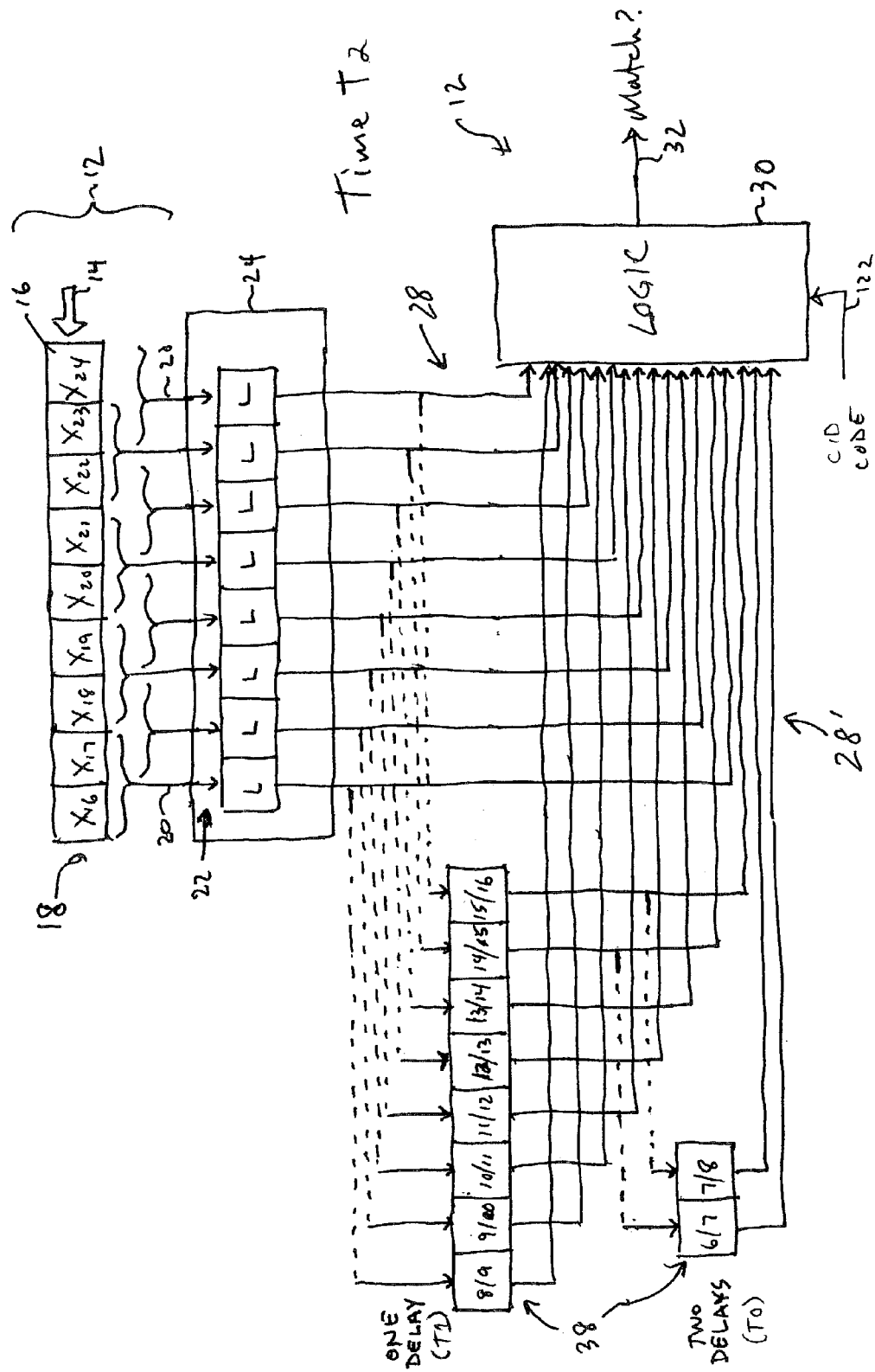

Reference is now made to FIGS. 6A and 6B wherein there is shown a preferred implementation of the FIG. 2B-*type* solution to handle pattern matching in a high speed, network security, installation. In this preferred implementation, matching to P=12 byte table patterns 25 with a nine cell 16 (N=9) shift register 18 is supported with respect to the examination of a data packet stream 14. Operation of this pattern matcher at very high speeds, for example, at a line rate up to, and in excess of, 2.4 Gbits per second, is possible.

As discussed above, the bytes X of the data packet stream 14 are sequentially block shifted into the register 18 N−1=8 bytes at a time. In other words, with each clock cycle, a block of N−1=8 new bytes are shifted into the register 18 while a block of N−1=8 old bytes are shifted out of the register. With each clock cycle, the pattern matcher 12 further generates N−1=8 overlapping stream pattern byte chunks 20. It will be remembered that matching to P byte patterns requires the presence of P−1 chunks 20. The needed chunks are not available for use by the logic 30 from the register 18 alone in this clock cycle. It is recognized, however, that the register did consider matches to the missing chunks 20 during previous clock cycle(s) and that these look-up returns 28 can be saved and used again. Thus, the logic 30 considers not only the corresponding N=8 returns 28 for the current clock cycle, but also returns 28 from two previous clock cycles (as needed). To assist with this operation, and with consideration of the need to match plural locations across the N−1=8 byte shift, the pattern matcher 12 utilizes a ten cell historical memory 38 to temporarily save the needed returns 28 from the two previous clock cycles for application as returns 28' during a current clock cycle. The selective use of consecutive ones of the returns 28/28' for each shift location allows the logical combiner 30 to have access to the consecutive P−1 chunk look-ups and corresponding returns across the block shift which are necessary to make the match determination independently at each shift location and generate the match indication 32 or the clock cycle.

To illustrate this, consider a certain clock cycle T1 in FIG. 6A wherein the N=9 cells 16 of the shift register 18 are loaded with the bytes (the string):

$X_8,X_9,X_{10},X_{11},X_{12},X_{13},X_{14},X_{15}, X_{16}$

During clock cycle T1, the pattern matcher 12 will divide (partition) the bytes of the string into N−1=8 overlapping stream pattern byte chunks 20 as follows:

$(X_8,X_9), (X_9,X_{10}), (X_{10},X_{11}), (X_{11},X_{12}), (X_{12},X_{13}), (X_{13},X_{14}), (X_{14},X_{15}), (X_{15},X_{16})$

Each of these overlapping stream pattern byte chunks 20 is then output for application in parallel 22 to the pattern table 24 for comparison (look-ups L) to the table pattern byte chunks 26 stored therein. If each of the stream pattern byte chunks 20 is found in the pattern table 24, first logic states will be returned 28 with respect to each chunk.

It must be remembered, however, that during the previous clock cycle T0, the N=9 cells 16 of the shift register 18 were loaded with the following stream pattern:

$X_0,X_1,X_2,X_3,X_4,X_5,X_6,X_7, X_8$ and thus only the byte $X_8$ is shared in common between the matching operations performed in the consecutive clock cycles. Still further, during the previous clock cycle T−1, the N=9 cells 16 of the shift register 18 were loaded with the following stream pattern (string):

$X_{-8},X_{-7},X_{-6},X_{-5},X_{-4},X_{-3},X_{-2},X_{-1},X_0$

Due to the two byte overlap, the P=12 byte table patterns to be matched and the N−1=8 byte block shift, the logical combiner 30 needs to have access to the returns 28 from the previous clock cycle T0 with respect to the following overlapping stream pattern byte chunks 20:

$(X_0,X_1), (X_1,X_2), (X_2,X_3), (X_3,X_4), (X_4,X_5), (X_5,X_6), (X_6,X_7), (X_7,X_8)$ and the returns 28 from the previous clock cycle T−1 with respect to the following overlapping stream pattern byte chunks 20:

$(X_{-2},X_{-1}), (X_{-1},X_0)$

These returns 28 are accordingly preserved from clock cycles T−1 and T0 in the historical memory 38, and are then provided, as reused returns 28', in clock cycle T1 along with the current set of returns 28 (for a total of P−1 chunk look-up returns). Selected, consecutive, ones of the current clock cycle returns 28 and/or historic returns 28' from the prior clock cycle are then processed, by the logic 30, on an independent basis for each shift location, to determine whether a match indication 32 is generated. An illustrative discussion, along with an exemplary implementation, of this selective use process was provided above. The FIGS. 6A and 6B implementation of the logic 30 is much more complex than that illustrated in FIG. 5, but nonetheless follows the same theoretical principles and is thus well within the design capabilities of one skilled in the art using a similar architectural format.

To assist in future processing, the returns 28 for the following overlapping stream pattern byte chunks 20:

$(X_8,X_9), (X_9,X_{10}), (X_{10},X_{11}), (X_{11},X_{12}), (X_{12},X_{13}), (X_{13},X_{14}) (X_{14},X_{15}), (X_{15},X_{16})$ from the current clock cycle T1, plus the returns 28 for the following overlapping stream pattern byte chunks 20:

$(X_6,X_7), (X_7,X_8)$ from the previous clock cycle T0, are saved in the historical memory 38 for later use in the next clock cycle (to fill in the needed additional returns necessary to reach the needed P−1 returns across the block shift).

Now, with reference to FIG. 6B, assume time advances by one to the next clock cycle T2. With this advancement, the N−1=8 oldest bytes in the register 18 are shifted out, and N−1=8 next bytes in the data packet stream 14 are shifted in. At this point in time, the N=9 cells 16 of the shift register 18 are loaded with the following bytes (the string):

$X_{16},X_{17},X_{18},X_{19},X_{20},X_{21},X_{22},X_{23},X_{24}$

During clock cycle T2, the pattern matcher 12 will divide the bytes of the string into N−1=8 overlapping stream pattern byte chunks 20 as follows:

$(X_{16},X_{17}), (X_{17},X_{18}), (X_{18},X_{19}), (X_{19},X_{20}), (X_{20},X_{21}), (X_{21},X_{22}), (X_{22},X_{23}), (X_{23},X_{24})$

Each of these overlapping stream pattern byte chunks 20 is then output for application in parallel 22 to the pattern table 24 for comparison (look-ups L) to the table pattern byte chunks 26 stored therein. Again, selected ones of the returns 28/28' are used by the logic to check for an independent pattern match each shift location, with a match at any shift location resulting in the generation of a match indication 32 for the clock cycle.

Again, it will be understood that the needed returns 28 from the clock cycle (T2) and (T1) will be saved in the historical memory 38 to assist with the examination during the next clock cycle (T3). The foregoing process then repeats over and over to continue examination and screening of the stream 14.

It was mentioned previously that an assumption is made by the pattern matcher 12 that if each applicable stream pattern byte chunk 20 (current and perhaps historical) is found in the pattern table 24 (i.e., matching a table pattern byte chunk 26) then the stream pattern 19 under examination matches one of the table patterns 25. This assumption, however, is not entirely accurate. Consideration of an example may assist in better understanding the limitations of the byte chunk matching process implemented by the present invention.

Consider first a scenario wherein the table patterns 25 are the following:

ABBCD

CDABD

DEABC

The two-byte overlapping table pattern byte chunks 26 for these three table patterns (as stored in the pattern table 24) are therefore:

AB,BB,BC,CD

CD,DA,AB,BD

DE,EA,AB,BC

Suppose now that the stream pattern 19 under examination was:

ABECD

This pattern produces the following stream pattern byte chunks 20:

AB,BE,EC,CD for parallel application 22 to the pattern table 24. The table look-up operation would then produce the following returns 28:

true,false,false,true which, when logically combined, would correctly produce a "no match" indication 32 (since ABECD is not one of the table patterns 25 ABBCD, CDABD or DEABC).

Now, however, consider the same table patterns 25 with a stream pattern 19 of:

ABCDE

The pattern produces the following stream pattern byte chunks 20:

AB,BC,CD,DE for parallel application 22 to the pattern table 24. The table look-up operation would then produce the following returns 28:

true,true,true,true which, when logically combined, would incorrectly produce a "match" indication 32 (noting that ABCDE is not one of the table patterns 25 ABBCD, CDABD or DEABC).

The engine 10 is accordingly quite capable of producing "false positive" results. A question then arises as to whether the user cares. In some situations, the presence of false positives may be of no concern to the user since the resulting alert or alarm 34 and/or capture or block operation may trigger a further follow-up to more carefully examine the packet traffic which has been flagged. For example, a multi-level screening operation could be performed with the engine 10 comprising a first (or lower) level of screening where matches flag parts of the packet traffic for greater scrutiny at a second (or higher) level of screening where additional care is taken to distinguish the false positives from the true positives. An example of such a multi-level screening system where the engine 10 may be used is described in co-pending, commonly assigned U.S. patent application Ser. No. 10/217,862 filed Aug. 12, 2002, the disclosure of which is hereby incorporated by reference.

In the event that a higher degree of accuracy is desired with respect to the operation of the engine 10, the table patterns 25 may be assigned to various ones of a plurality of "classes." In this context, "classes" refers to an intelligent grouping of table patterns 25 together in a manner which assists in reducing instances of false positive matches. This concept may be better understood by revisiting the "false positive" generating example as set forth above.

Consider again the following table patterns 25:

ABBCD (1)
CDABD (1)
DEABC (2)

The parentheticals (x) indicate which of two separate classes the table patterns have been assigned (grouped). The two-byte overlapping table pattern byte chunks 26 for these three table patterns (as stored in the pattern table 24) are therefore:

AB,BB,BC,CD (1)
CD,DA,AB,BD (1)
DE,EA,AB,BC (2)

Again, the parentheticals (x) indicate the class to which each of the byte chunks have been assigned. Suppose now that the stream pattern 19 under examination was:

ABCDE

This pattern produces the following stream pattern byte chunks 20:

AB,BC,CD,DE for parallel application 22 to the pattern table 24. In this instance, however, the look-up operation is segregated by class. By this it is meant that the stream pattern byte chunks 20 are matched against the table pattern byte chunks 26 of class (1) separately from being matched against the table pattern byte chunks 26 of class (2). With respect to the matching operation for class (1), the table look-up operation would produce the following returns 28:

true,true,true,false which, when logically combined, would correctly produce a "no match" indication 32 (noting that ABCDE is not one of the table patterns 25 ABBCD or CDABD in class (1)). With respect to the matching operation for class (2), the table look-up operation would produce the following returns 28:

true,true,false,true which, when logically combined, would also correctly produce a "no match" indication 32 (noting that ABCDE is not one of the table patterns 25 DEABC in class (2)). In this way, because "no match" was found for both classes, the engine correctly found "no match" overall and addressed the "false positive" issue.

The grouping of the patterns into classes may be implemented in the engine 10 by including a plurality of memories 100 within the pattern table 24 such that each memory is associated with a different class and each memory only includes the table pattern byte chunks 26 for the table patterns assigned to its associated class. The classification of the pattern table is illustrated in FIG. 1 with the inclusion of two memories 100 (designated "(1)" and "(2)") for two corresponding classes. It will, however, be understood that any selected number of classes may be designed into the engine 10. A preferred embodiment of the present invention utilizes at least four different classes. Although not specifically illustrated in the other FIGURES, it will further be understood that each of the pattern tables 24 may similarly include one or more memories 100 for the purpose of addressing the class issue and assisting in the resolution of false positive indications 32.

The provision of plural classes in the pattern memory 24, however, does add an additional level of complexity to the operations performed by the logical combiner 30. In this regard, it is noted that each stream pattern byte chunk 20 look-up operation (see, the "L" designation in the FIGURES) will now produce a number of returns 28 which corresponds to the number of classes (i.e., one return for each memory 100). Thus, as an example, if two classes are provided in the pattern table 24 (as discussed above), each stream pattern byte chunk 20 look-up will produce two separate returns 28 (as designated by the "/2" indication associated with each return 28). The logical combiner 30 operation should preferably preserve this separation and thus produce separate match indications 32 (i.e., one indication per class). In this manner, the logic circuitry used in the logic combiner 30 (for example, see FIG. 5) will need to be replicated (in parallel) a number of times equal to the anticipated number of possible classes.

To further reduce the likelihood of false positive indications, it is recognized that larger table patterns produce fewer false positives. For example, an eight byte table pattern is much less likely to produce a false positive indication than a five byte table pattern due to the fact that a significantly increased number of chunks must be matched in order for the logic combiner 30 to find an overall match. The engine 10 of the present invention takes advantage of this concept by supporting a plurality of table pattern lengths with the table pattern byte chunks 26 stored in the pattern table 24 (each pattern length may also be considered a "class").

Figure 6C:
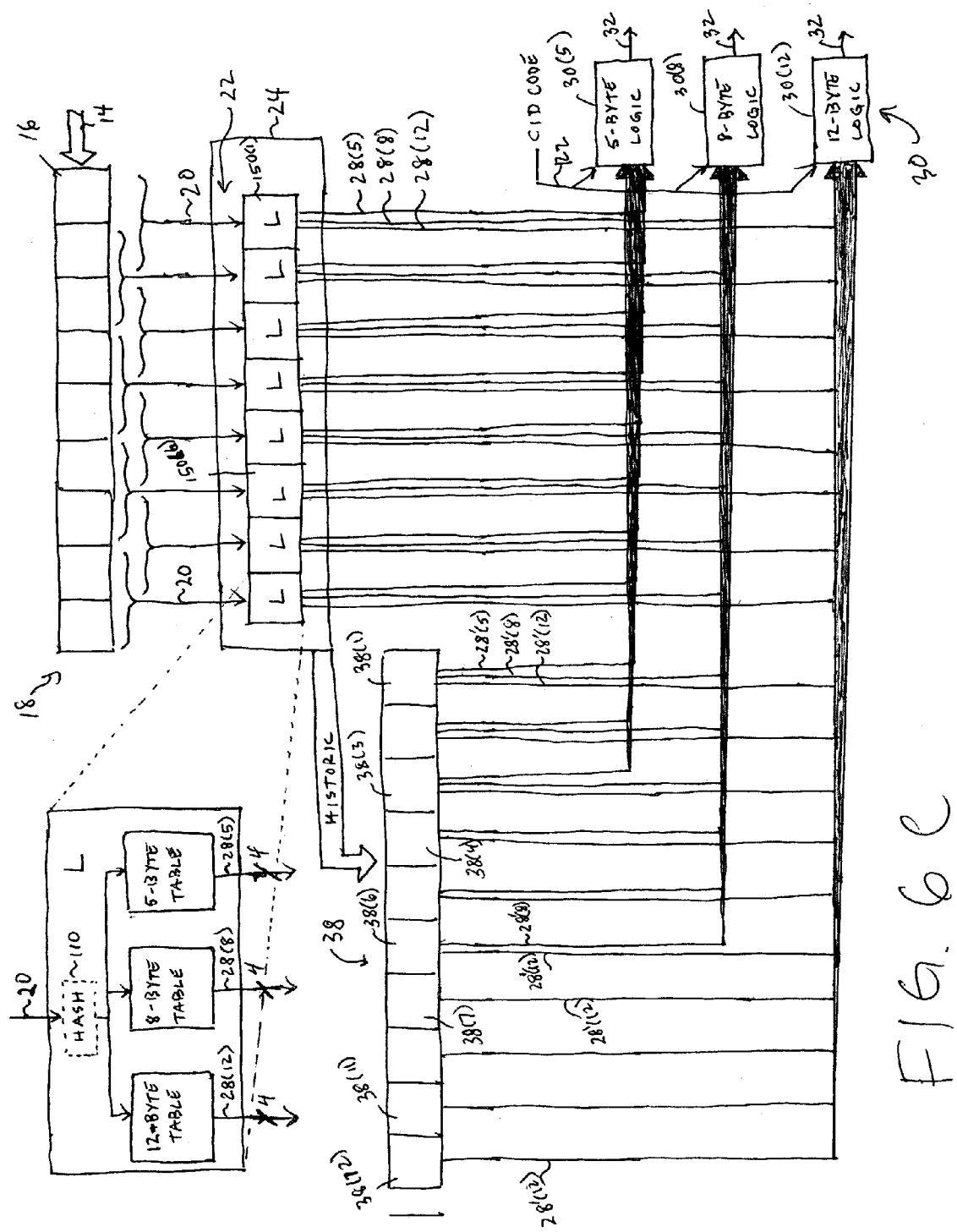
FIG. 6C illustrates another preferred implementation of the packet traffic screening engine.

This may be better understood by examining FIG. 6C which illustrates the preferred implementation of the engine (compare to FIGS. 6A and 6B and to FIGS. 3 and 4) using a nine cell 16 (N=9) shift register 18 to match P=12 byte, P=8 byte and P=5 byte table patterns with respect to the examination of a data packet stream 14 having a line rate up to, and in excess of, 2.4 Gbits per second.

The bytes X of the data packet stream 14 are sequentially block shifted into the register 18 N−1=8 bytes at a time. In other words, with each clock cycle, a block of N−1=8 new bytes are shifted into the register 18 while a block of N−1=8 old bytes are shifted out of the register. With each clock cycle, the pattern matcher 12 further generates N−1=8 overlapping stream pattern byte chunks 20. Each of these overlapping stream pattern byte chunks 20 is then output for application in parallel 22 to the pattern table 24 for comparison (look-ups L) to the table pattern byte chunks 26 stored therein.

In the preferred implementation of FIG. 6C, each look-up operation includes separate parallel look-ups in a 5-byte table, an 8-byte table and a 12-byte table. More specifically, the 5-byte table includes the table pattern byte chunks 26 associated with any 5-byte table patterns 25, the 8-byte table includes the table pattern byte chunks 26 associated with any 8-byte table patterns 25, and the 12-byte table includes the table pattern byte chunks 26 associated with any 12-byte table patterns 25. Thus, as a result of the look-up operation performed for a stream pattern byte chunk 20, a separate return 28 is provided with respect to each one of the byte tables (i.e., return 28(5) from the 5-byte table, return 28(8) from the 8-byte table and return 28(12) from the 12-byte table).

Figure 7:
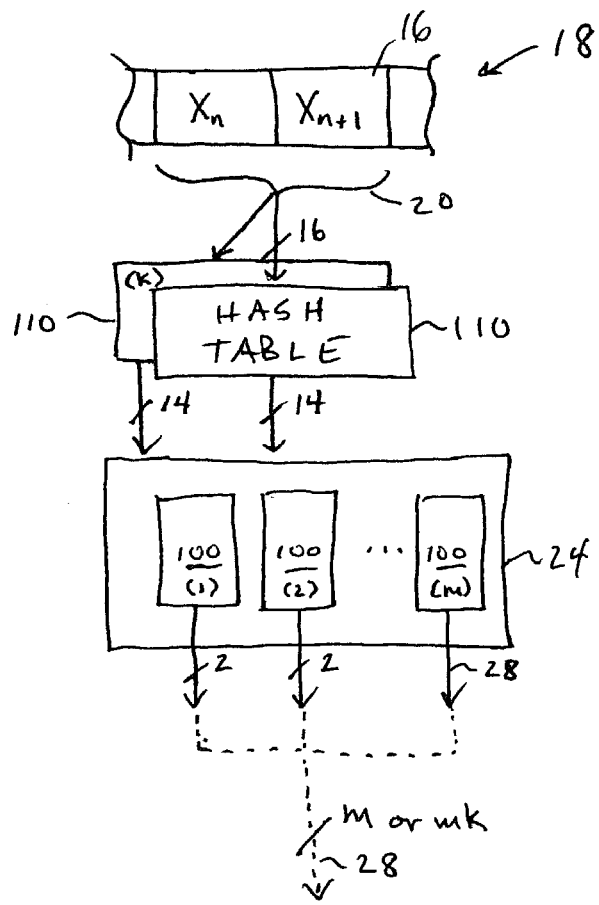
FIG. 7 illustrates a mechanism utilized by the engine to reduce pattern table memory requirements.

Even more specifically, as shown in FIGS. 1 and 7, each of the 5, 8 and 12-byte tables includes a plurality of memories 100 (preferably four) to support the use of pattern table classes. Thus, each separate return 28 from a byte table (i.e., the returns 28(5), 28(8) and 28(12)) will include one bit for each of the included memories 100 in the pattern table to designate whether a match was found with respect to each of the included pattern table classes. This is indicated in FIG. 6C by the "/4" designation associated with the returns 28(5), 28(8) and 28(12).

The engine 10 further includes a ten cell historical memory 38, wherein each cell may, if needed, store plural returns 28 with respect to a single past look-up operation. For example, cell 38(1) of the historical memory 38 stores the returns 28(5), 28(8) and 28(12) with respect to a look-up (L) 150(1) one clock cycle in the past. Cell 38(6) of the historical memory 38 stores the returns 28(8) and 28(12) with respect to a look-up (L) 150(6) one clock cycle in the past. Still further, cell 38(11) of the historical memory 38 stores the returns 28(12) with respect to a look-up (L) 150(1) two clock cycles in the past (i.e., the return 28(12) from cell 38(1) one clock cycle in the past). The illustrations in FIGS. 2A, 3A, 3B, 6A and 6B, as well as their associated descriptions herein, explain why this historical return information is needed and how it is stored and processed. Specific illustration as to how and from where the cells in the historical memory 38 are loaded is omitted in order to simplify the FIG. 6C illustration. It should be recognized, however, that the historical returns are provided so that the logic combiner 30 can have access to the P−1 returns needed to make the match determination in situations where the size of the register is reduced and block shifting is implemented in order to increase the speed at which pattern matching can occur.

The general operation of the logic combiner 30 for making the match determination is reiterated as follows: the returns 28 which are preserved in the historical memory 38 from previous clock cycle(s) are provided, as reused returns 28', in the current clock cycle along with the returns 28 generated from the look-ups (L) in the current clock cycle. A set of first logic states for appropriate current clock cycle returns 28 and/or appropriate prior clock cycle(s) historic returns 28' with respect to each of the stream pattern byte chunks 20 at issue will cause the logic 30 to generate an indication 32 of a positive match. Again, it must be remembered that selective use is made of these returns 28/28' so that match determinations can be made independently at each individual shift location. Because, however, the implementation of FIG. 6C performs 5-byte, 8-byte and 12-byte pattern matching, the logic 30 must be divided into three corresponding separate logic functions (30(5), 30(8) and 30(12)) to perform the appropriate match tests. Thus, the logic 30(5) for making 5-byte match determinations bases its match indication 32 determination on the necessary (i.e., selected based on shift location) ones of the current clock cycle returns 28 and the prior clock cycle historic returns 28' from cells 38(1)–38(3) of the historical memory 38. The logic 30(8), on the other hand, for making 8-byte match determinations bases its match indication 32 determination on the necessary (i.e., selected based on shift location) ones of the current clock cycle returns 28 and the prior clock cycle historic returns 28' from cells 38(1)–38(6) of the historical memory 38. Lastly, the logic 30(12) for making 12-byte match determinations bases its match indication 32 determination on the necessary (i.e., selected based on shift location) ones of the current clock cycle returns 28 and the prior clock cycles historic returns 28' from cells 38(1)–38(12) of the historical memory 38.

The system of FIG. 6C, like the other implementations illustrated herein, is advantageously programmable in that the table patterns of interest can be modified, deleted, updated, and the like, as necessary by simply reprogramming the pattern table 24 with the appropriate table chunks. Flexibility and tailoring of the pattern matching operation is further supported by implementing multiple memories 100 to support plural classes of table patterns. Still further, the system is easily scalable in terms of the number of table patterns as well as the different lengths of table patterns. Adjustments to the size of the pattern table, and the nature and complexity of the logic 30 facilitate such scaling without significantly sacrificing speed of operation.

It will be recognized that if a large number of table patterns are of interest, that the memory requirements (i.e., memory size) for the pattern table 24, in general, and each memory 100 therein, specifically, can be quite significant. Reference is now made to FIG. 7 wherein there is shown a mechanism to reduce memory requirements within the pattern table 24. To simplify the illustration and explanation, the look-up in the pattern table with respect to a single stream pattern byte chunk 20 is illustrated. Assuming a two-byte overlap and eight bits per byte, each stream pattern byte chunk 20 will comprise sixteen bits ("/16" designation as shown in FIG. 7). In order to reduce the memory requirements associated with a sixteen bit address lookup, the engine 10 utilizes a hash table 110 (within either the pattern matcher 12 or the pattern table 24) to transform the sixteen bit address lookup into a smaller, for example, fourteen bit ("/14" designation as shown in FIG. 7), address lookup. The implementation and operation of hash tables are well known to those skilled in the art, and thus further detailed explanation will not be provided. The hash table 110 may further be used as indicated in the preferred implementation of FIG. 6C discussed above.

It is recognized that the use of a smaller lookup address may produce additional false positive results (even when utilized in conjunction with the class and string length solutions discussed above). To address this concern, the engine 10 may choose to instead implement plural hash tables 110 with respect to the processing of each stream pattern byte chunk 20. More specifically, the sixteen bit address lookup is transformed by the plural hash tables 110 into a corresponding number of smaller, for example, fourteen bit, address look-ups. Each of the plural hash tables 110 will implement a different transform in anticipation that the combined transforms used by the plural hash tables will address the false positive issues experienced with the use of just a single hash table. The comparisons performed by the pattern table 24 with respect to each of the smaller address look-ups produce separate returns 28 with respect to the same stream pattern byte chunk 20 (see, "/2" designation in FIG. 7 to correspond to the two hash tables 110 being used), and the logic combiner 30 then logically combines the plural returns 28 with respect to each single stream pattern byte chunk 20 to produce a combined return. Generally speaking, the logic combiner 30 must find a match for the look-up with respect to each of the hashed addresses in order to find a true return 28 with respect to the single stream pattern byte chunk 20.

It is also possible for the size of the look-up addresses to be reduced by programming the pattern table with case insensitive data (i.e., a character is represented in the memory of the pattern table 24 without regard to its case) and then ignoring the case bit(s) within the byte chunk 20 which is applied during look-up. This feature may be used, if desired in conjunction with the use of one or more hash tables as discussed above to provide for an even greater reduction in address bits.

FIG. 7 further illustrates the use of plural memories 100 within the pattern table 24. As discussed above, such plural memories may be advantageously utilized in connection with the implementation of classes as a mechanism to reduce the likelihood of false positives. In the illustrated implementation, m memories 100 are provided to support to division of the table patterns into m corresponding classes. With this configuration, each stream pattern byte chunk 20 look-up will produce m separate returns 28 (as designated by the "/m" indication associated with each return 28). It will of course be recognized that in the event multiple hash tables 110 are used, for example, k different hash tables, then each stream pattern byte chunk 20 look-up will produce (m×k) separate returns 28 (as designated by the "/mk" indication associated with each return 28).

Figure 8:
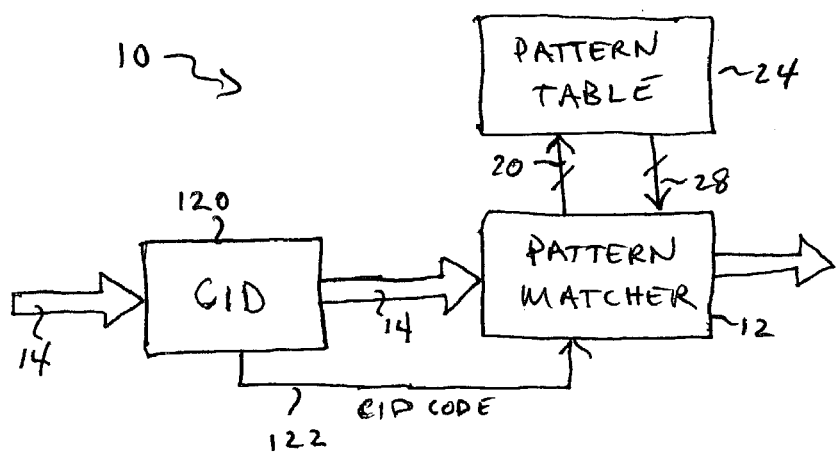
FIGS. 8–11 are block diagrams illustrating an engine for packet traffic screening in accordance with other embodiments of the present invention.

Reference is now made to FIG. 8 wherein there is shown a block diagram illustrating an engine for packet traffic screening in accordance with another embodiment of the present invention. This embodiment, like the embodiment illustrated in FIG. 1, utilizes a pattern matcher 12 and pattern table 24 as described above. Thus, further detailed explanation of the pattern matcher 12 and pattern table 24 is omitted except as needed to explain pertinent differences and distinctions between the two embodiments. The engine 10 of FIG. 8 further includes a class identifier (CID) function 120 being performed on the received data packet stream 14 prior to pattern matching. The class identifier function 120 generally examines the header of each packet and further looks at the nature of the sequence of packets within the passing stream 14. From this analysis, the class identifier function 120 classifies the packets and/or the flow of packets and generates a CID code 122 indicative of that classification. This CID code 122 is then utilized, in a manner to be described in more detail below, that assists the pattern matcher 12 in performing a more efficient and effective screening of the flow.

Generally speaking, the flow is examined by the class identifier function 120 quickly and in a manner that does not implicate examining the payload. For example, the header of each packet may be examined for information of interest such as what are the contents of certain header fields of interest (source address, destination address, and the like). As another example, the stream is examined in an attempt to identify what type of traffic is passing (for example, http, ftp, and the like). Information about data rate may also be extracted by the class identifier function 120. From one or more of the collected pieces of interest, the class identifier function 120 determines and outputs the appropriate CID code 122 which categorizes or classifies the stream.

It is recognized that the classification of the packets/flow supplied by the CID code can be advantageously utilized by the pattern matcher 12 in performing a more efficient and effective screening of the stream 14. When a user identifies table patterns to be screened for, and/or classifies those table patterns (for storage in certain memories 100), it may further be recognized that those table patterns are only of interest to certain classes/categories of packets/flows as identified by the class identifier function and represented by the CID code 122. In this way, the CID code can be used to refine the screening operation performed by the pattern matcher 12 by directing or focusing the look-ups with respect to the pattern table classes. Only in the event that the look-ups indicate a match in a certain pattern table class, and further only if the CID code 122 specifies that a match in that pattern table class is pertinent to the class identifier function 120 classified or categorized packets/flow, will a match indication 32 be produced.

The foregoing may be better understood through the examination of some specific examples. Suppose that the pattern table 24 includes a plurality of memories 100, each relating to a different pattern table class as described above to reduce the likelihood of false positives. A first of those memories stores table pattern byte chunks 26 for table patterns which relate to the screening of http traffic. A second of those memories stores table pattern byte chunks 26 for table patterns which relate to the screening of ftp traffic. A third of those memories stores table pattern byte chunks 26 for table patterns which relate to the screening of traffic from a certain source IP address.

In a first example, assume that the stream 14 was examined by the class identifier function 120 and a determination was made that the packets/flow were http traffic. An appropriate CID code 122 (indicative of http traffic) would then be generated and supplied to the pattern matcher 12. Stream pattern byte chunks 20 are then generated by the pattern matcher and supplied to the pattern table 24 for application to each of the memories 100. If the returns 28 from the first of those memories (i.e., the one storing table pattern byte chunks 26 for table patterns which relate to the screening of http traffic) indicate a match, the logic 30 would further compare the http-indicative match with the CID code 122 (which indicates the packets/flow are http traffic), and issue a match indication 32. Conversely, if the first memory indicated a match, but the CID code 122 did not indicate that the packets/flow were http traffic, the logic 30 would ignore the http memory 100 match and not issue a match indication.

In a second example, assume that the stream 14 was examined by the class identifier function 120 and a determination was made that the packets/flow were ftp traffic. An appropriate CID code 122 (indicative of ftp traffic) would then be generated and supplied to the pattern matcher 12. Stream pattern byte chunks 20 are then generated by the pattern matcher and supplied to the pattern table 24 for application to each of the memories 100. If the returns 28 from the second of those memories (i.e., the one storing table pattern byte chunks 26 for table patterns which relate to the screening of ftp traffic) indicate a match, the logic 30 would further compare the ftp-indicative match with the CID code 122 (which indicates the packets/flow are ftp traffic), and issue a match indication 32. Conversely, if the first memory indicated a match, but the CID code 122 did not indicate that the packets/flow were ftp traffic, the logic 30 would ignore the ftp memory 100 match and not issue a match indication.

In a third example, assume that the stream 14 was examined by the class identifier function 120 and a determination was made that the packets/flow were ftp traffic from the certain source IP address. An appropriate CID code 122 (indicative of ftp traffic and source address) would then be generated and supplied to the pattern matcher 12. Stream pattern byte chunks 20 are then generated by the pattern matcher and supplied to the pattern table 24 for application to each of the memories 100. If the returns 28 from the second of those memories (i.e., the one storing table pattern byte chunks 26 for table patterns which relate to the screening of ftp traffic) indicate a match, the logic 30 would further compare the ftp-indicative match with the CID code 122 (which indicates the packets/flow are ftp traffic), and issue a first match indication 32. If the returns 28 from the third of those memories (i.e., the one storing table pattern byte chunks 26 for table patterns which relate to the screening of traffic from the certain source IP address) indicate a match, the logic 30 would further compare the source address indicative match with the CID code 122 (which indicates the packets/flow are from the source IP address), and issue a second match indication 32. In certain cases, either match indication 32 may be sufficient to trigger and alarm or filtering, for example, of the stream 14. In other cases, the logic 30 may further require both match indications 32 to be present before issuing an alarm or taking action to filter the stream 14.

Thus, the foregoing description and examples show that a match indication 32 in the embodiment of FIG. 8 occurs only when a match is found with respect to a pattern table class which corresponds to the class identifier function 120 classification of the packets/flow. In this way, it becomes clear why it is important, as discussed above, for the engine 10 to preserve the classed returns 28 through the operation of the logic 30. Without such a preservation, it would be impossible to use the CID code 122 in further refining the match determination. FIG. 5 illustrates how the ORed output may further be applied to additional logic which receives the CID code 122. In the event both the CID code 122 relating to a certain packet/flow class and the logically combined returns 28 for a certain pattern table class are true, then a match indication 32 is output.

The use of the class identifier function 120 CID code 122 in combination with the pattern table class provides an additional level of protection against the issuance of false positives. For example, without the presence and use of the CID code 122, stream pattern byte chunks 20 applied to the ftp class memory 100 may return a match with respect to a stream of ftp traffic. Such a false positive match, however, is of little to no significance given the type of traffic being screened. The use of the CID code 122 addresses this issue and enhances the level of false positive protection being provided by the engine 10.

Figure 9:
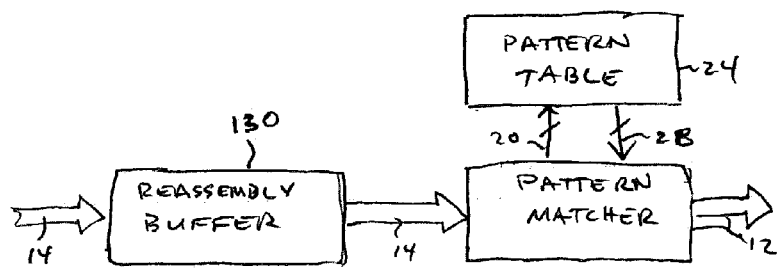

Reference is now made to FIG. 9 wherein there is shown a block diagram illustrating an engine for packet traffic screening in accordance with another embodiment of the present invention. This embodiment, like the embodiment illustrated in FIG. 1, utilizes a pattern matcher 12 and pattern table 24 as described above. Thus, further detailed explanation of the pattern matcher 12 and pattern table 24 is omitted except as needed to explain pertinent differences and distinctions between the two embodiments. The engine 10 of FIG. 9 further includes a reassembly buffer 130 which operates on the received data packet stream 14 prior to pattern matching. It is recognized by those skilled in the art that packets in a stream 14 may arrive out of order and further that boundary condition issues may arise. The reassembly buffer 130 functions to ensure that the pieces of a flow are properly put together before screening is performed. More specifically, the buffer 130 puts the packets in proper order and further addresses boundary issues with respect to the flow such that the stream 14, when processed by the pattern matcher 12, is examined in the proper order and examined for matches across boundaries.

Figure 10:
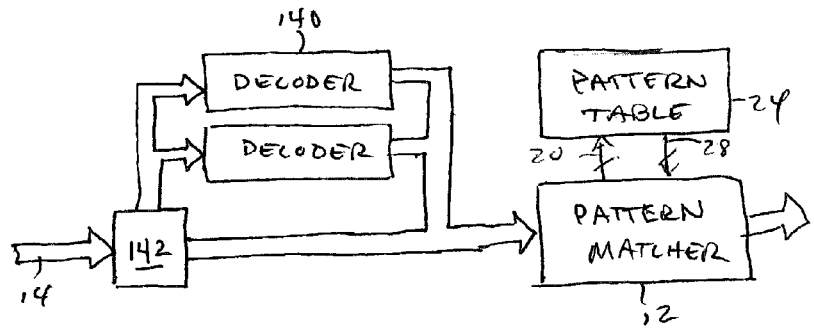

Reference is now made to FIG. 10 wherein there is shown a block diagram illustrating an engine for packet traffic screening in accordance with another embodiment of the present invention. This embodiment, like the embodiment illustrated in FIG. 1, utilizes a pattern matcher 12 and pattern table 24 as described above. Thus, further detailed explanation of the pattern matcher 12 and pattern table 24 is omitted except as needed to explain pertinent differences and distinctions between the two embodiments. The engine 10 of FIG. 10 further includes at least one, and preferably a plurality of, decoders 140. The decoders 140 are used when needed or desired to translate the stream 14 into a common format (language) prior to pattern matching. In this way, the pattern table 24 need not be configured to handle patterns in different formats. For example, the stream 14, or portions thereof, may be encoded in HEX or UNICODE. Prior to pattern matching, it is desired to have the encoded bytes decoded through the use of the decoders 140. A translation decision function 142 examines the bytes within the stream 14 and identifies those which need to be decoded. These bytes are passed on to the appropriate decoder 140 for processing. Following decoding, the bytes are passed to the pattern matcher 12 for screening as discussed in detail above. What is important to keep in mind with the decoders 140 is a preference that all traffic being screened be converted into a normalized/base format so that a single version of the table patterns can be stored in the pattern table 24.

As a processing alternative with respect to the issue of translations, it will be understood that the pattern table 24 may be loaded with encoded and decoded table patterns (perhaps in separate pattern table classes), and thus the use of decoders 140 may be obviated. Still further, as another processing alternative, the bytes may be passed to the pattern matcher 12 in both their coded and decoded states for screening.

Figure 11:
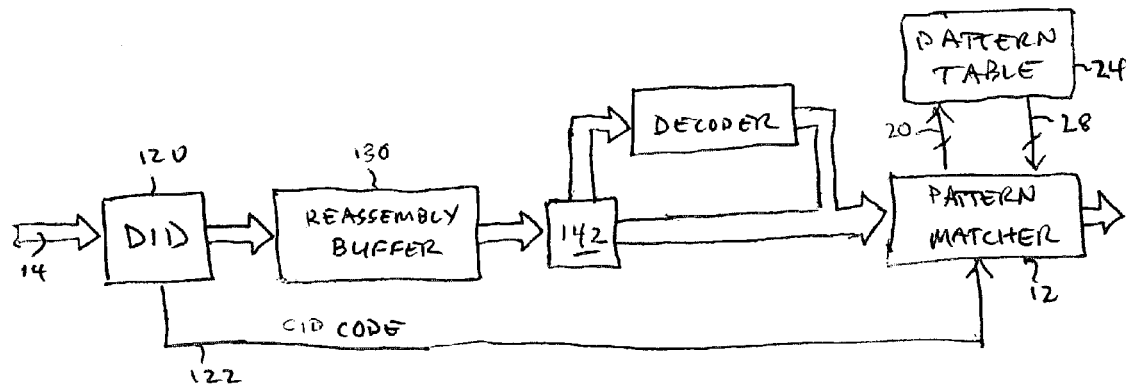

Reference is now made to FIG. 11 wherein there is shown a block diagram illustrating an engine for packet traffic screening in accordance with another embodiment of the present invention. This embodiment, like the embodiment illustrated in FIG. 1, utilizes a pattern matcher 12 and pattern table 24 as described above. Thus, further detailed explanation of the pattern matcher 12 and pattern table 24 is omitted except as needed to explain pertinent differences and distinctions between the two embodiments. The engine 10 of FIG. 11 utilizes a combination of the embodiments illustrated in FIGS. 8–10, described in detail above. Although FIG. 11 illustrates the combined use of all three embodiments of FIGS. 8–10, it will be understood that alternative embodiments using any selected two of the three embodiments are also possible.

The engine 10 of the present invention is advantageously and preferably implemented entirely in hardware. Such an implementation facilitates high rate operation. Historically, hardware-only pattern matcher implementations have not been favored because of their inability to modified or tailored over time. The present invention addresses this concern, while still providing hardware design, by utilizing the pattern table memory to store the table pattern byte chunks 26 associated with the table patterns of desired 5-byte, 8-byte and 12-byte pattern matches. When needed, the memory can be easily modified to add or delete certain table pattern byte chunks 26. Still further, the pattern table supports the use of plural memories, not only with respect to supporting plural size table pattern matching, but also with respect to supporting plural classes. Again, the memories within the pattern table can be easily modified to alter the chunks within table pattern size and/or within class, to allow the hardware design to support a software design-like flexibility.

Figure 12:
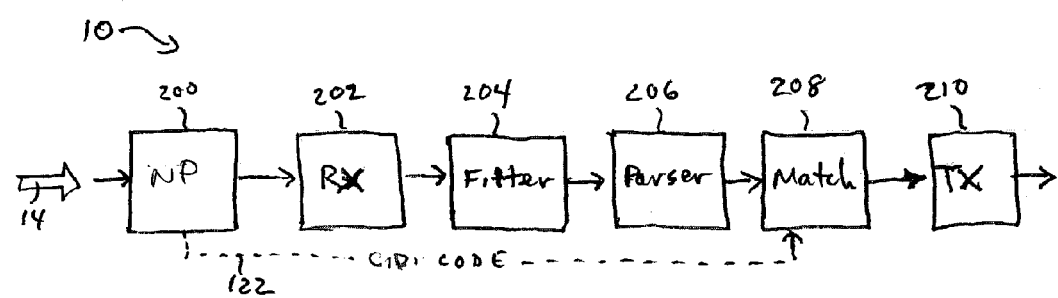
FIG. 12 is a hardware functional block diagram for a preferred implementation of the pattern matching engine of the present invention.

Reference is now made to FIG. 12 wherein there is shown a hardware functional block diagram for a preferred implementation of the pattern matching engine of the present invention. A network processor (NP) 200 receives the data stream 14 over a PL3 bus in a 32 bit wide format. The processor 200 performs the class identifier function (FIG. 8, reference 120 and associated description) by quickly reviewing the data stream without examining the payload. An examination is made of the header of each packet, as well as the nature of the sequence of packets within the passing stream 14. From this analysis, the processor 200 classifies the packets and/or the flow of packets and generates a CID code 122 indicative of that determined classification. This CID code 122 is a twelve bit value wherein each included bit specifically indicates whether pattern matching is an issue of interest with respect to certain classes within each of a plurality of different pattern matches (for example, one bit for each of four separate classes in 5-byte, 8-byte and 12-byte tables). More specifically, the examination of the stream 14 performed by the processor 200 assists in assuring that the screening (i.e., pattern matching) operations are pertinent to a given packet/flow/session. Examples of this evaluation process, and its affect on the matching determination, were provided above in connection with the discussion of FIG. 8. The CID code 122 is preferably appended to each packet following its classification.

A receiver (RX) 202 receives the data stream 14 over a unidirectional PL3 bus from the processor 200. The receiver 202 functions as a PL3 link layer receive standard interface. The data width of the bus 204 is 32 bits. By adjusting the rate at which the PL3 bus is clocked, the engine 10 can be configured to handle line rates up to and in excess of 4.2 Gbits per second (for example, with a 133 MHz clock). Internal FIFO memory is provided within the receiver 202 to temporarily store arriving data. The FIFO functions to additionally provide rate adaptation and clock synchronization between the PL3 interface and the internal logic of the engine 10. In a preferred implementation, the data is converted to 64 bits before writing into the FIFO (which may have a 4 Kbit size divided into 32 byte blocks). Once a block is full, the buffered data is output.

A data filter 204 receives output blocks routed from the receiver 202 and outputs the received data eight bytes at a time (i.e., for a given clock cycle as discussed above in connection with the FIG. 2A implementation).

A packet parser 206 functions to parse packet header information with respect to the stream 14 identify where the payload of each packet may be found. To accomplish this, the received data is output from the parser 208 along with an enable indicator which identifies whether the data should (i.e., it is payload) or should not (i.e., it is header) be pattern matched. The parser 206 further ensures that packet sequence within the stream is correct (see also, FIG. 9). This is accomplished by tracking sequence number.

The engine 10 further includes a pattern matcher 208 (see also, reference 14 as discussed above). The pattern matcher 208 searches packets for desired 5-byte, 8-byte and 12-byte patterns within the payload section (as identified by the parser 206; see also, FIG. 6C and its associated description) or across the payload boundaries of TCP packets. Every two adjacent bytes of each packet payload (the stream pattern byte chunks 20) are used as addresses into a pattern table (see, reference 24 discussed above). The data returned from the pattern table is a twelve bit value, wherein each bit indicates the existence of match/no match with respect to a plurality of different classes within each of the 3 different (5-byte, 8-byte and 12-byte) pattern matches (for example, 4 classes could be provided for each pattern match). A match can theoretically be indicated in any one, more than one or all of the values. For a 5-byte match to occur, each two-byte pair (chunk 20) in a five-byte string must produce a match to stored library two-byte pairs (the table pattern byte chunks 26) in at least one class of the 5-byte pattern table. Similarly, for an 8-byte match to occur, each two-byte pair (chunk 20) in an eight-byte string must produce a match to stored library two-byte pairs (chunks 26) in at least one class of the 8-byte pattern table. Lastly, for a 12-byte match to occur, each two-byte pair (chunk 20) in a twelve-byte string must produce a match to stored library two-byte pairs (chunks 26) in at least one class of the 12-byte pattern table.

The output twelve bit value is then logically ANDed with the twelve-bit CID code 122 generated earlier by the fast pattern processor 200. In the event at least one bit of the ANDed result is true (logic 1, for example), a pattern match is deemed to have been found and the packet is flagged for differential treatment (such as, for example, rerouting) and/or an alarm is generated. In the event the match occurs across TCP boundaries, a re-route flag may be set to indicate to the engine 10 that all future packets in the same TCP session should be differentially treated. As an option, a flag may also be set to indicate to the engine that future packets within a same TCP session should be differentially treated.

In the event that pattern matcher 208 detects that packets are arriving out of order, the out of order packet is routed for differential treatment (without any need for pattern matching to occur), and all future packets in that same TCP session are similarly handled.

The pattern matched stream 14 is then switched out to a transmitter (TX) 210 through a PL3 bus. This bus, like the receiver 202 input bus, is preferably clocked at a rate which supports line rates up to and in excess of 4.2 Gbits per second.

The engine 10 illustrated in FIG. 12 is preferably physically implemented using a circuit board containing a plurality of interconnected integrated circuit chips. These chips preferably comprise a combination of commercial off-the-shelf chips (for example, the NP 200) configured to perform desired functions, and custom implemented processing chips designed to perform desired functions (FPGA structures comprise one possible implementation solution; custom fabricated chips comprise another option). Necessary memory, as well as other functions, for the engine 10 may be either embedded in the included integrated circuit chips or provided as discreet components.

Although disclosed with a preferred hardware-only implementation, it will be understood by those skilled in the art that the disclosed functionality could alternatively be implemented in a software-based solution for an application where very high line rate processing was not required.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A pattern matching device implemented in hardware and operable to match multi-byte data stream patterns against multi-byte library patterns, comprising:
    a shift register storing a string portion of consecutive bytes from a data stream and operable to partition the string portion into a plurality of overlapping adjacent stream byte chunks;
    a look-up table storing overlapping adjacent table byte chunks of the library patterns, the look-up table receiving the stream byte chunks for the string portion in parallel for look-up against the stored table byte chunks; and
    a logic circuit operable to collect results of the parallel look-ups and process those results to make a match determination.

2. The device of claim 1 wherein the pattern matching device operates to match at data stream line rates greater than or equal to one gigabit per second.

3. The device of claim 2 wherein the pattern matching device operates to match at data stream line rates greater than or equal to two gigabits per second.

4. The device of claim 3 wherein the pattern matching device operates to match at data stream line rates greater than or equal to 2.4 gigabits per second.

5. The device of claim 1 wherein the pattern matching device receives a data stream comprising data packet payloads and wherein the match is performed with respect to the data packet payloads.

6. The device of claim 1 wherein the pattern matching device receives a data stream comprising data packets having headers and payloads and wherein the match is performed with respect to both the data packet headers and payloads.

7. The device of claim 1 wherein the data stream comprises a multiplicity of data bytes, the shift register further operable to shift a block comprising plural consecutive data bytes into the register with each clock cycle.

8. The device of claim 7 wherein each block shift retains at least one byte in common between consecutive strings within the register.

9. The device of claim 1 wherein the look-up table comprises a plurality of look-up tables, each look-up table storing overlapping adjacent table byte chunks for different classes of library patterns to be found.

10. The device of claim 9 wherein the different classes of library patterns comprise different length patterns for each look-up table.

11. The device of claim 9 wherein the different classes of library patterns comprise different traffic category patterns for each look-up table.

12. The device of claim 11 further including a traffic processor operable to examine and categorize the data stream before pattern matching, the logic circuit further including a logic process that emphasizes those results collected from the look-up table whose traffic category patterns are pertinent to the data stream categorization in making the match determination.

13. The device of claim 9 wherein the stream byte chunks for the string portion are simultaneously applied in parallel to the plurality of look-up tables.

14. The device of claim 9 wherein the logic circuit comprises a separate logic process for processing the results collected from each look-up table.

15. The device of claim 1 wherein the shift register has N cells and the library patterns have P bytes, and wherein N=P.

16. The device of claim 1 wherein the shift register has N cells and the library patterns have P bytes, and wherein N<P.

17. The device of claim 1 wherein the shift register has N cells and the library patterns have P bytes, and wherein N>P.

18. The device of claim 1 further including a hash table that processes the stream byte chunks before application to the look-up table.

19. The device of claim 1 wherein the string portion is the stream pattern to be matched against the library patterns.

20. The device of claim 1 wherein the string portion is a portion of the stream pattern to be matched against the library patterns.

21. The device of claim 1 wherein the string portion includes the stream pattern to be matched against the library patterns.

22. The device of claim 1 wherein the data stream comprises a multiplicity of data bytes, the shift register further operable to shift a block comprising plural consecutive data bytes into the register with each clock cycle, the device further including an historical memory for storing look-up results collected from the look-up table in a previous clock cycle with respect to the stream byte chunks of a previous block of data bytes, the logic circuit operable to process collected results from a current clock cycle with the stored results from the previous clock cycle to make the match determination.

23. The device of claim 22 wherein the historical memory stores look-up results collected from the look-up table with respect to a plurality of previous clock cycles.

24. The device of claim 22 wherein the data stream comprises a plurality of distinct flows of interleaved data packets, the historical memory storing the look-up results collected from previous clock cycles with respect to each flow, and the logic circuit operable to process the stored results from the historic memory pertinent to the data bytes of the flow currently in the register.

25. The device of claim 1 further including a decoder operable to decode encoded portions of the data stream before pattern matching.

26. The device of claim 25 wherein the overlapping adjacent table byte chunks of the library patterns are stored in the look-up table in both encoded and decoded format, and match determinations are made with respect to both the encoded and decoded portions of the data stream.

27. The device of claim 1 further including a reassembly buffer operable to reassemble out of order data packets within the data stream before pattern matching.

28. The device of claim 1 wherein the pattern matching device receives a data stream comprising plural distinct flows of interleaved data packets and wherein the unanchored match is performed with respect to each flow of data packets.

29. A method for matching multi-byte data stream patterns against multi-byte library patterns, the multi-byte library patterns being partitioned into overlapping adjacent table byte chunks, comprising the steps of:
receiving a string portion of consecutive bytes from a data stream;
partitioning the string portion into a plurality of overlapping adjacent stream byte chunks;
determining whether each of the stream byte chunks matches an overlapping adjacent table byte chunk;
logically combining results of determining step to make a match determination.

30. The method of claim 29 wherein the data stream comprises a plurality of distinct flows of interleaved packets, and the step of logically combining includes the step of making the match determination with respect to each flow.

31. The method of claim 29 wherein the data stream comprises a plurality of distinct flows of interleaved packets, further including the step of determining to which flow a certain packet belongs, the step of logically combining including the step of considering results associated with the flow to which the certain packet belongs in making the match determination.

32. The method of claim 29 wherein the step of determining comprises the step of matching the plurality of overlapping adjacent stream byte chunks against the overlapping adjacent table byte chunks in parallel.

33. The method of claim 29 further including the step of storing the overlapping adjacent table byte chunks in a look-up table.

34. The method of claim 29 further including the step of storing the overlapping adjacent table byte chunks in a plurality of look-up tables, each look-up table storing overlapping adjacent table byte chunks for different classes of library patterns to be found.

35. The method of claim 34 wherein the different classes of library patterns comprise different length patterns for each look-up table.

36. The method of claim 34 wherein the different classes of library patterns comprise different traffic category patterns for each look-up table.

37. The method of claim 36 further including the step of:
categorizing the data stream before pattern matching;
wherein the step of logically combining includes the step of emphasizing those results collected from the look-up table whose traffic category patterns are pertinent to the data stream categorization in making the match determination.

38. The method of claim 34 wherein the stream byte chunks for the string portion are applied in parallel to the plurality of look-up tables.

39. The method of claim 34 wherein the step of logically combining comprises the step of separately processing the results collected from each look-up table in making match determinations.

40. The method of claim 29 wherein the matching is performed in an unanchored fashion.

41. The method of claim 40 wherein the data stream comprises data packet payloads and wherein the unanchored match is performed with respect to the data packet payloads.

42. The method of claim 40 wherein the data stream comprises data packets having headers and payloads and wherein the unanchored match is performed with respect to both the data packet headers and payloads.

43. The method of claim 29 wherein the matching occurs at data stream line rates greater than or equal to one gigabit per second.

44. The method of claim 43 wherein the matching occurs at data stream line rates greater than or equal to two gigabits per second.

45. The method of claim 44 wherein the matching occurs at data stream line rates greater than or equal to 2.4 gigabits per second.

46. A pattern matcher, comprising:
a shift register connected to receive a data flow including multi-byte data stream patterns, the shift register partitioning a stored string portion of consecutive bytes from the received data flow into overlapping adjacent substrings;
a look-up table that is accessed by the shift register to search for each overlapping adjacent substring in parallel, the look-up table generating a return for each search indicative of whether the overlapping adjacent substring is present; and
an accumulator that collects the returns from the look-up and determines whether the multi-byte data stream pattern matches a multi-byte library pattern.

47. The pattern matcher of claim 46 wherein the data stream comprises a plurality of distinct flows of interleaved packets, and the accumulator operates to make the match determination with respect to each flow.

48. The pattern matcher of claim 46 wherein the data stream comprises a plurality of distinct flows of interleaved packets, each packet having a state which associates the packet to a certain one of the distinct flows, the pattern matcher determining packet state and the accumulator collecting the returns associated with the certain flow indicated by determined state to which the packet belongs in making the match determination.

49. The pattern matcher of claim 46 wherein the matching of multi-byte data stream patterns against multi-byte library patterns is performed in an unanchored fashion with respect to the data stream.

50. The pattern matcher of claim 49 wherein the matching of multi-byte data stream patterns against multi-byte library patterns is performed at a data stream line rate in excess of one gigabits per second.

51. The pattern matcher of claim 49 wherein the matching of multi-byte data stream patterns against multi-byte library patterns is performed at a data stream line rate in excess of two gigabits per second.

52. The pattern matcher of claim 46 wherein the data stream comprises a multiplicity of data bytes, the shift register further operable to shift a block comprising plural consecutive data bytes into the register with each clock cycle.

53. The pattern matcher of claim 46 wherein each multi-byte library pattern is partitioned into overlapping adjacent table byte chunks which are stored in the look-up table, the look-up table generated return indicating that the overlapping adjacent substring is present when it matches one of the overlapping adjacent table byte chunks.

54. The pattern matcher of claim 53 wherein the look-up table comprises a plurality of look-up tables, each look-up table storing overlapping adjacent table byte chunks for different classes of library patterns.

55. The pattern matcher of claim 54 wherein the different classes of library patterns comprise different length patterns for each look-up table.

56. The pattern matcher of claim 54 wherein the different classes of library patterns comprise different traffic characterization patterns for each look-up table.

57. The pattern matcher of claim 56 further including a data stream processor operable to characterize the data stream before pattern matching, the accumulator further including a logic process that emphasizes those returns collected from the look-up table whose traffic characterization patterns are pertinent to the data stream characterization in making the match determination.

58. The pattern matcher of claim 54 wherein the accumulator comprises separate logic processes for combining the returns collected from different look-up tables.

59. The pattern matcher of claim 46 further including a hash table that converts a bit address of each stream byte chunk to a reduced bit address before application to the look-up table.

60. The pattern matcher of claim 46 further including an historical memory for storing look-up returns collected from the look-up table in previous clock cycle(s), the accumulator including logic processes for combining collected returns from a current clock cycle with the stored returns from previous clock cycle(s) to make the match determination.

61. The pattern matcher of claim 46 further including a decoder operable to decode encoded portions of the data stream before pattern matching.

62. The pattern matcher of claim 46 further including a reassembly buffer operable to reassemble out of order data packets within the data stream before pattern matching.

* * * * *